United States Patent
Joseph

(10) Patent No.: US 10,497,237 B2
(45) Date of Patent: *Dec. 3, 2019

(54) SECURITY TAG FOR INVENTORY AND ANTI-THEFT ALARM SYSTEM

(71) Applicant: SMTP Associates, LLC, Jamaica, NY (US)

(72) Inventor: Joseph Joseph, Jamaica, NY (US)

(73) Assignee: SMTP Associates, LLC, Jamaica, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,909

(22) Filed: Dec. 4, 2017

(65) Prior Publication Data

US 2018/0089974 A1   Mar. 29, 2018

Related U.S. Application Data

(63) Continuation of application No. 14/924,013, filed on Oct. 27, 2015, now Pat. No. 9,836,934, which is a continuation-in-part of application No. 14/506,117, filed on Oct. 3, 2014, now Pat. No. 9,328,537, which is a continuation-in-part of application No. 14/181,136, filed on Feb. 14, 2014, now Pat. No. 8,947,235, which is a continuation-in-part of application No. 13/200,778, filed on Sep. 30, 2011, now Pat. No. 8,669,873.

(51) Int. Cl.
| | | |
|---|---|---|
| G08B 13/14 | (2006.01) | |
| G08B 13/24 | (2006.01) | |
| E05B 73/00 | (2006.01) | |
| G06Q 10/08 | (2012.01) | |
| G06Q 30/06 | (2012.01) | |
| G06Q 50/28 | (2012.01) | |

(52) U.S. Cl.
CPC ...... *G08B 13/2434* (2013.01); *E05B 73/0017* (2013.01); *G06Q 10/087* (2013.01); *G06Q 10/0833* (2013.01); *G06Q 30/06* (2013.01); *G06Q 50/28* (2013.01); *G08B 13/2417* (2013.01); *G08B 13/2462* (2013.01); *G08B 13/2482* (2013.01)

(58) Field of Classification Search
CPC . G08B 13/2402; G08B 13/14; E05B 73/0017; G06Q 10/087
See application file for complete search history.

(56) References Cited

U.S. PATENT DOCUMENTS

| | | | | |
|---|---|---|---|---|
| 2006/0163348 A1* | 7/2006 | Yoked | ............... | G06K 19/07703 235/383 |
| 2008/0297442 A1* | 12/2008 | Gelbman | ............... | G06F 3/1454 345/55 |
| 2012/0218110 A1* | 8/2012 | Forster | ............... | G06K 19/07372 340/572.1 |

* cited by examiner

*Primary Examiner* — Phung Nguyen
(74) *Attorney, Agent, or Firm* — Carter, DeLuca & Farrell LLP

(57) ABSTRACT

The disclosed technology relates to a security tag. The security tag can include a tamper assembly having a clutch mechanism capable of affixing the security tag to a merchandise item and a locking device for inserting into the clutch mechanism. An insertion of the locking device into the clutch mechanism causes a transmission of a closed signal indicating a closed status for the security tag, and a displacement of the locking device causes a transmission of an open signal indicating an open status for the security tag.

18 Claims, 28 Drawing Sheets

SECURITY TAG FOR INVENTORY AND ANTI-THEFT ALARM SYSTEM

CROSS-REFERENCE TO RELATED APPLICATIONS

This application is a continuation of U.S. patent application Ser. No. 14/924,013, filed on Oct. 27, 2015, now U.S. Pat. No. 9,836,934, which is a continuation in part of U.S. patent application Ser. No. 14/506,117, filed on Oct. 3, 2014, now U.S. Pat. No. 9,328,537, which is a continuation in part of U.S. patent application Ser. No. 14/181,136, filed on Feb. 14, 2014, now U.S. Pat. No. 8,947,235, which is a continuation in part of U.S. patent application Ser. No. 13/200,778, filed on Sep. 30, 2011, now U.S. Pat No. 8,669,873. The entire disclosures of each of the foregoing patent applications are incorporated herein by reference in their entirety to provide continuity of disclosure.

BACKGROUND OF THE INVENTION

The subject matter described herein relates to an inventory and anti-theft alarm system using Radio Frequency Identification, a/k/a "RFID".

In current RFID technology, if an RFID inventory tag is removed from an item of merchandise and the RFID inventory tag is left on premises (e.g., the original location of where the item of merchandise was located) but the associated item is stolen, an RFID tag inventory scan would locate the RFID tag and consider the item accounted for. These inventory scans are typically done with an RFID handheld device or an antenna array and the scans fails to detect the actual item of merchandise as missing from the premises because the tag can still be located. This leads to a false conclusion that the item of merchandise associated with the tag is still on the premises.

Security and inventory management are sensitive issues in retail management of small as well as big stores that offer a range of products to their customers. Such stores generally have global and local strategies of security and anti-theft. The stores generally fix the prices of their products with pre-printed labels. These prices, however, may quickly change in reaction to variable factors such as (1) change in supply and demand, (2) Holiday shopping season sales or (3) any other quick response dependent events. When these prices change, an employee must physically go to each item and change the price. This process is time consuming and has many chances for human error e.g., mismarking an item with a wrong price.

Various computer based systems for security merchandise management have been used in the past. These systems generally include a detection mechanism that identifies the movement of merchandise stored at predefined locations in the stores. Other inventory management and security systems include tags on products that transmit signals to a server using radio signals for security purposes. These systems proved to be useful to monitor the merchandise in the stores, however, the tags are very delicate and have very short battery lifespan.

BRIEF SUMMARY OF THE INVENTION

The disclosed technology relates to an inventory and/or anti-theft alarm system that can monitor the opening or closing of a security tag. That is, an insertion of a locking device into a clutch mechanism of the security tag causes a transmission of a closed signal, indicating a closed status for the security tag, to a tracking server. And a displacement of the locking device causes a transmission of an open signal, indicating an open status for the security tag, to the tracking server.

In one implementation, a security tag can comprise: a tamper assembly, the tamper assembly including a clutch assembly capable of affixing the security tag to a merchandise item and a locking device for inserting into the clutch mechanism, an insertion of the locking device into the clutch mechanism causes a transmission of a closed signal indicating a closed status for the security tag, and a displacement of the locking device causes a transmission of an open signal indicating an open status for the security tag.

In some implementations, the security tag can comprise: a display, the display showing at least one attribute of the merchandise data, wherein the display can be an electronic paper display.

In some implementations, the security tag can comprise: a transmitter, the transmitter transmitting the closed signals and the open signals, wherein the transmitter can be a 433 MHz uhf transmitter/receiver.

In another implementation, a security tag can comprise: a tamper assembly, the tamper assembly including a clutch assembly capable of affixing the security tag to a merchandise item and a locking device for inserting into the clutch mechanism, an insertion of the locking device into the clutch mechanism causes a transmission of a closed signal indicating a closed status for the security tag, and a displacement of the locking device causes a transmission of an open signal indicating an open status for the security tag; and a display, the display showing at least one attribute of the merchandise data.

In another implementation, a security tag can comprise: a tamper assembly, the tamper assembly including a clutch assembly capable of affixing the security tag to a merchandise item and a locking device for inserting into the clutch mechanism, an insertion of the locking device into the clutch mechanism causes a transmission of a closed signal indicating a closed status for the security tag, and a displacement of the locking device causes a transmission of an open signal indicating an open status for the security tag; and a transmitter, the transmitter transmitting the closed signals and the open signals.

In another implementation, a security tag can comprise: a tamper assembly, the tamper assembly including a clutch assembly capable of affixing the security tag to a merchandise item and a locking device for inserting into the clutch mechanism, an insertion of the locking device into the clutch mechanism causes a transmission of a closed signal indicating a closed status for the security tag, and a displacement of the locking device causes a transmission of an open signal indicating an open status for the security tag; a transmitter, the transmitter transmitting the closed signals and the open signals; and a display, the display showing at least one attribute of the merchandise data.

The disclosed technology further relates to an inventory and/or anti-theft alarm system that can monitor the opening or closing of a security tag and provide a unique rolling sequence of logical events for tracking and analyzing an item of merchandise. This is done to determine if the rolling sequence of events is performed in proper logical sequential order.

In particular, each alarm tag of the present invention can include an encoded unique RFID inlay that has a unique number assigned to each tag and has the ability to be located within a designated area, e.g., a store, warehouse or container. The alarm tag can also include an RF transmitter, a circuit or a "counting/cut chip", a locking pin and a cable/clutch assembly that monitors and keeps track of the sequential events and numbers such events so that every time the locking pin is locked (circuit closed), unlocked or tampered with an event can be recorded.

The "counting/cut" chip and the RFID inlay may share the same tag as there is a systematic association between the "counting/cut" chip and the unique encoded RFID inlay number. The "counting/cut" chip and the RFID inlay interact with each other to permit the writing of data or the reading of data relative to the locking or unlocking or cut cable/broken circuit transactions at the tag. These locking/unlocking events are used to discover if an inappropriately sequenced event occurs and, if so, the inappropriately sequenced event will be referred to a manager for potential theft investigation.

The disclosed technology further employs RFID technology to provide a logical real time or near-real time status concerning the locking, unlocking or tampering of the tag associated with the item of merchandise via the opening and/or closing of the on-board circuit. The system will also identify whether the tagged item is or is not present on the premises and if on premises, identify the location of the merchandise.

Additionally, the system may include a plurality of programmable RFID tags where various attributes associated with the RFID tags can be changed remotely. The security tags may also include an internal "on-board" display that may display a price of the merchandise and any other attributes that may be useful for a consumer or employee to view. These attributes may be changed from a remote location in the store via the system with a verification module that rejects unauthorized requests to change the information on the RFID tag.

Furthermore, the system can be an RFID based merchandise management and security system that incorporates a security tag that responds to a predetermined secure wireless request from an authorized user. The information in the security tag may be changeable after receiving a valid wireless request from the system. For example, the price of the merchandise may be displayed on the respective security tag and this price is changeable by an authorized user from the central controller.

The advantage of the disclosed technology is that a retail store can have more control over security tags and the security tags can notify a central terminal if the tag is being tampered with thereby reducing theft.

DETAILED DESCRIPTION OF THE INVENTION

Figure 1A:
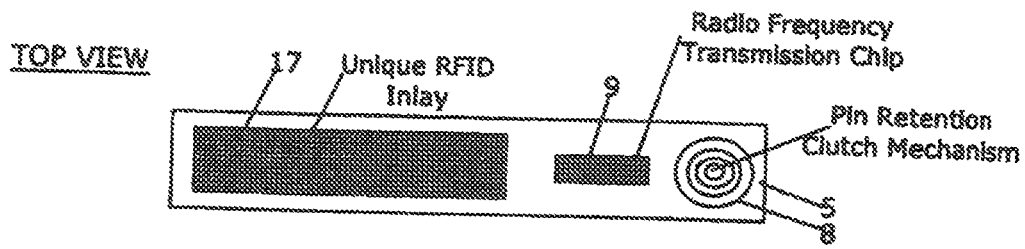
FIG. 1A is a top view or the RFID Tag of the present invention.

The disclosed technology relates to an inventory and/or anti-theft alarm system that can monitor the opening, closing or tampering of a security tag. That is, an insertion of a locking device into a clutch mechanism of the security tag causes a transmission of a closed signal, indicating a closed status for the security tag, to a tracking server. And a displacement of the locking device causes a transmission of an open signal, indicating an open status for the security tag, to the tracking server. The displacement of the locking device can be one of: cutting of the locking device, removing of the locking device from the clutch mechanism, cutting a body of the security tag at any location and applying pressure the locking device.

An inventory and antitheft alarm tag utilizes RFID technology. The system provides real time, near-real time or time of scan inventory and theft control while monitoring the time and date of each lock/unlock event and the sequence of these events.

FIGS. 1A-C and 2 illustrate a RFID tag system for the present invention as it is applied to an item of merchandise. The present invention provides for a system that provides an inventory and/or anti-theft alarm tag or label utilizing RFID technology. As each item is presented as inventory in the system it can be tagged or labeled with RFID technology that contains a unique RFID item number and is then associated with a SKU in a master database connected to a master computer within a network. If the item is selected for purchase by a customer, it is scanned at point of sale using an RFID scanner or handheld, and the RFID tag or label is deactivated and can be used again for another item of merchandise.

The master database 15 may also be interrogated by the system. The master database 15 (FIG. 2) contains pertinent information which is systematically matched to or related by information to the RFID tag 5. The master database 15 may contain, by way of non-limiting illustrative example, information such as SKU, color, style, size, cost, retail price, quantities, etc. of each item of merchandise. As noted previously, each item of merchandise will have its own unique RFID tag 5. The RFID tag 5 information includes a unique serial number which can include, but is not limited to, product keys such as for a class or department code to identify the associated item the tag 5. The master database 15 can index through the unique RFID items and their corresponding SKUs and/or other relevant information providing a valuable tool for identifying and locating the item being sought. In addition this information permits the present invention to effectively track the sequence for each lock/unlock/cut cable/commissioning/scan activity and assign a number for each activity, as described below in detail.

The disclosed technology ties RFID technology to a database so that the opening and closing of an RFID tag is captured by the opening/closing of a "circuit" with each insertion or removal of a tag pin which in turn ties directly to a logical sequence of open/close events flow of a piece of merchandise.

Figure 1B:
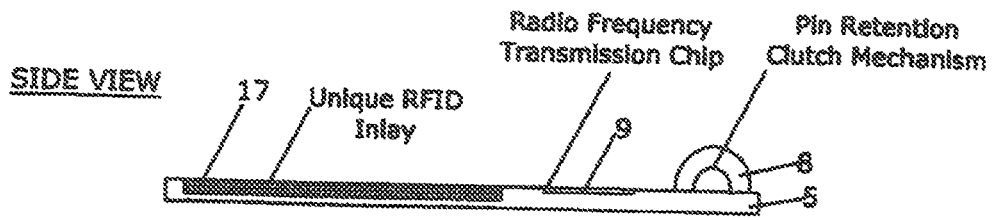
FIG. 1B is a side view of the RFID Tag of the present invention.
Figure 1C:
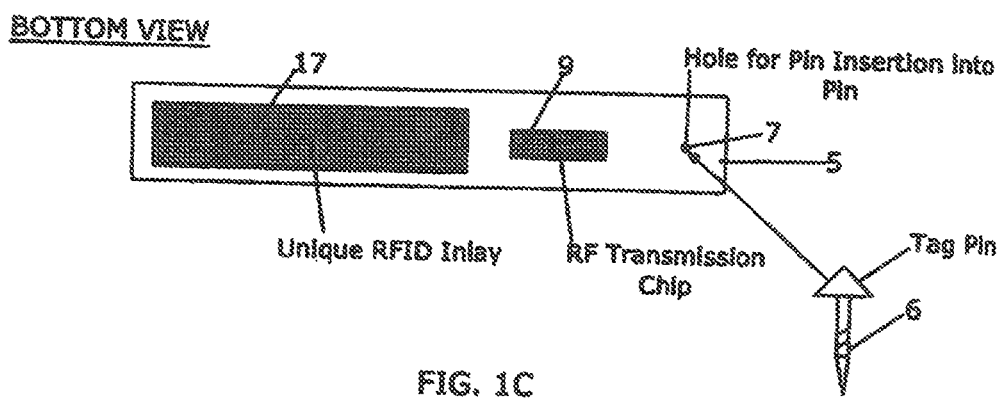
FIG. 1C is a bottom view of the RFID Tag of the present invention.
Figure 9A:
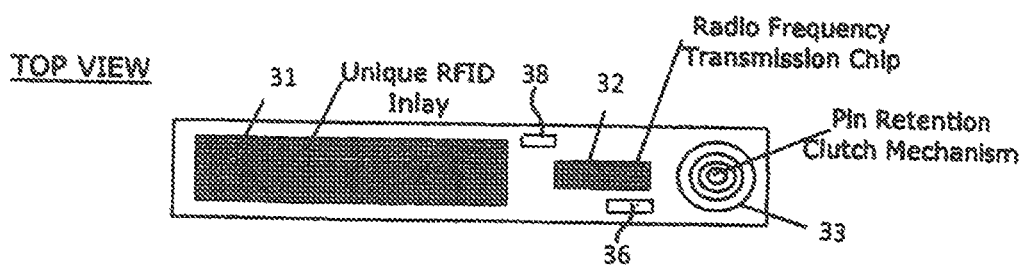
FIGS. 9a-c are various views of the RFID Tag of the present invention.
Figure 9B:
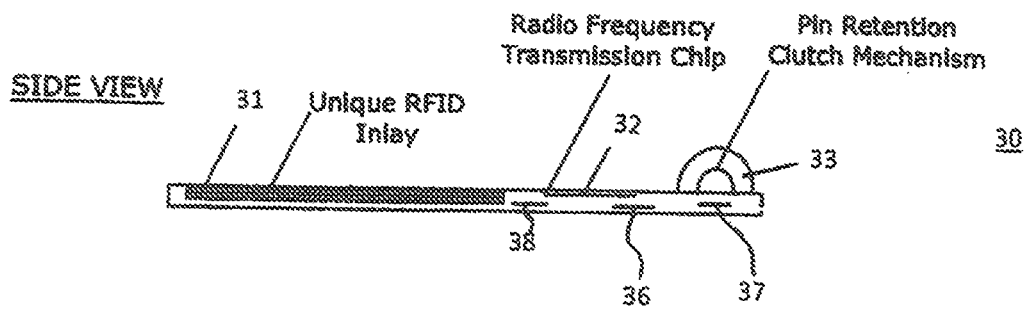
Figure 9C:
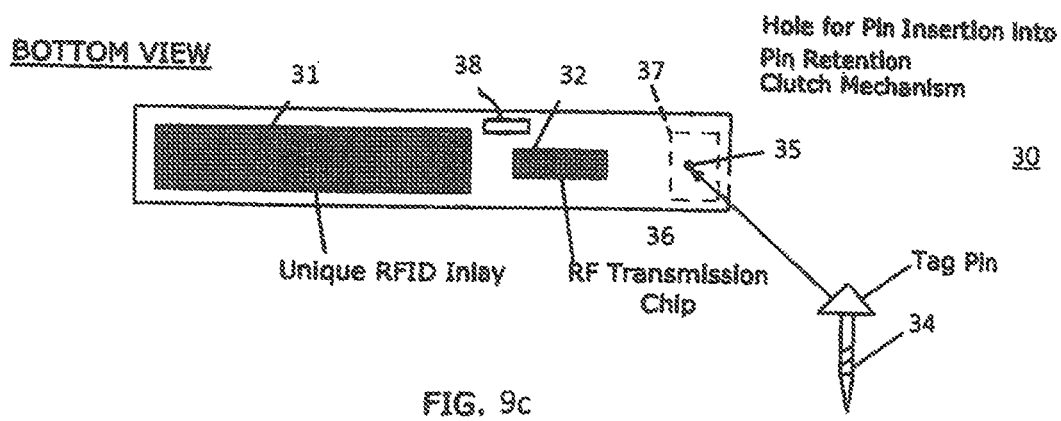

FIGS. 1A-C illustrate how the RFID tag 5 may be attached to an item of merchandise such as but not limited to a garment item or a pair of shoes. In a preferred embodiment of the present invention, as shown in FIG. 1A-C, an RFID tag 5 is equipped with a locking pin 6, a cable/clutch assembly 8, an on-board RF transmitter 9, a circuit, and/or a "counting/cut" chip incorporated in the RFID inlay 17. The "counting/cut" chip can keep track of sequential events using sequence numbers that increase by "1" every time the locking pin 6 is locked or unlocked or in the event the cable is cut which effectively breaks the circuit. Further, every time the event sequence number changes, caused by a locking or unlocking event or a cut cable, the on-board counting/cut chip would transmit the new sequence number to the RFID inlay 17 in the same tag 5 and/or to a receiver in the location. The insertion of the pin 6 or cable into the clutch mechanism in effect closes the loop in the circuit. If the pin is removed, or the cable is cut, the circuit is broken and the breaking of the circuit triggers a sequence event to the counting/cut chip. As shown in FIGS. 9a-c, the RFID tag 30 includes a unique RFID inlay 31, a radio frequency transmission chip 32, a counting chip 36 and a locking mechanism 33. e.g., a pin retention clutch mechanism 33 having a tag pin 34 and a pin insertion hole 35 as described above. In some implementations, the RFID tag can also incorporate a pressure sensor 36 that surrounds the pin insertion hole 35 within the RFID tag 30. That is, the pressure sensor 36 can be integral with the locking mechanism 33 and the counting chip 36. In use, if there is an undue amount of force applied to the locking mechanism 33, e.g., a force greater than one pound, the pressure sensor 36 triggers an open condition within the counting chip 36. The counting chip 36 will then transmit the open condition to the master database 15 and the master database 15 will determine if the open condition is out of sequence or in-sequence. If out of sequence, the master database 15 will trigger an alert signal, e.g., an alert can be sent to store personnel that a theft of merchandise may be occurring. This pressure sensor 37 allows the RFID tag to create an open condition whenever the locking mechanism 33 is being tampered with, e.g., an attempt to cut or remove the RFID tag 30 from an article is occurring. In another implementation, the pressure sensor 37 can incorporated with the counting chip 36 so that if there is an undue pressure applied to the pin 34 itself or the head of the pin 34, this pressure will activate the pressure sensor 37 and an open condition will be triggered within the counting chip 36. This open condition will then be evaluated on-board the tag 30 by comparing data contained on the RFID inlay 31 with the open condition event and, using a logic function or some other determination function, a determination will be made on-board the RFID tag 30 to see if the open condition is an in-sequence or out-of-sequence event. If out of sequence, an alert is triggered and is transmitted to the master database 15.

The software used by the invention is proprietary in design and as such we are providing an overview. The insertion of a pin 6 or lanyard into the clutch mechanism causes a transmission of a closed status for that particular RFID Tag 5 and its on-board circuitry 17. This information as well as date, time, operator, etc. are stored in the memory of the RF chip on the tag as well as in the master database and as such the "counting/closing" begins. Upon the pin being released from the clutch and/or the cable being cut, the circuit is broken triggering an "open" transaction that is captured by the database and stored. The software tracks status of the tag and updates status, for example, the tag is open and the circuit is open, the tag is closed by operator onto the garment, the tag is closed and circuit is closed, the data of the tag is passed electronically to a database and/or when the tag closes a Status Reported to Master Database and a Unique Sequence Event Recorded.

The tag 5 has an RFID inlay 17 and a pin 6 that is inserted into an opening 7 and locked in place by a clutch mechanism 8 to affix the tag 5 to the item of merchandise as shown in FIGS. 1A-C. The pin 5 and clutch mechanism 8 can be unlocked and relocked at point of sale. When the pin 5 is inserted into the clutch 8 at the time of RFID commissioning it completes a circuit for notifying the resident memory of the RFID tag or counting/cut chip that the tag is locked and records the time and date of each subsequent lock/unlock event. This information is provided to the master database 15 using the unique RFID encoded item number and the master database records the sequence of events for each RFID tag. The encoded item number which can be encoded in the inlay 17 that the item is locked and in inventory as well as the lock/unlock sequence number.

The process of "commissioning" is the process wherein the SKU, item number or UPC number of the item is "married" with the unique RFID number contained in the tag. This is accomplished by first obtaining a standard BAR code read of the item's SKU and then associating that number with the unique RFID number in the master database. Alternatively, if the SKU number is already known, the software can marry that number with the unique RFID number. This can be done on a conveyor system or one-by-one using a standard BAR code scanner and an RFID reader/writer. The associated pairing of the BAR code SKU and RFID tag number can be accessed by using either number as the index key within the system.

Figure 3:
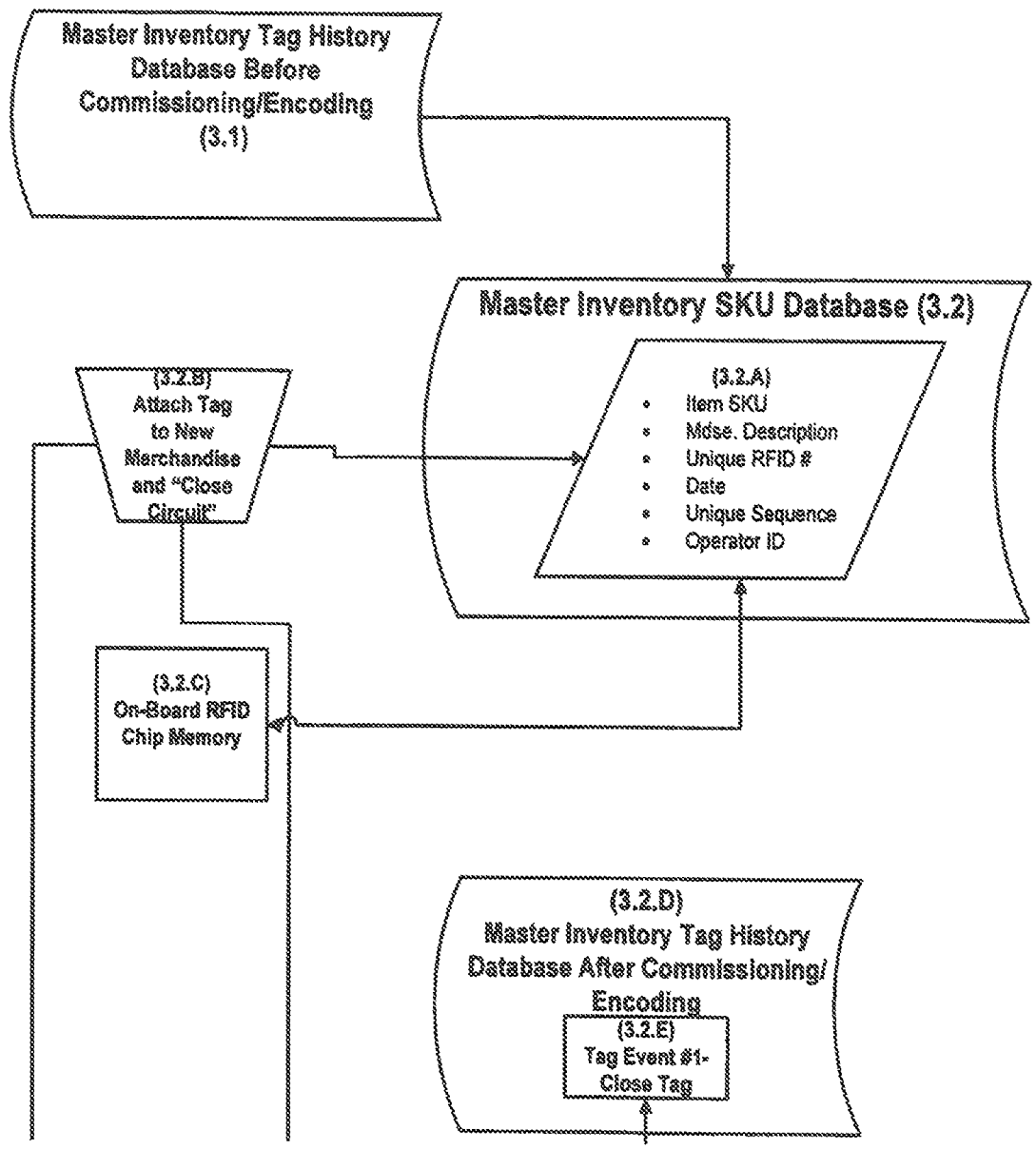
FIG. 3 is illustration of the present invention.

FIG. 3 shows a block diagram for the system. The Master Inventory Tag History Database before encoding of a new tag has no information on a tag until it is encoded (3.1.). The Master Inventory SKU Database contains information on every item that has been encoded (3.2) including, but not limited to: Item SKU, Merchandise Description, Unique RFID Tag Number, Date of Activity, Unique Sequence Number, and Operator ID (3.2.A). The RFID tag is attached to the new merchandise and "Close Circuit" status is sent to the Master Inventory Tag History Database (3.2.B). FIG. 3.2.D shows "Tag event #1-Closing of Tag" evidenced by 3.2.E and the association of that tag information is loaded to the Master Inventory SKU Database 3.2. FIG. 3.2.C shows the on-board memory chip or resident memory of the RFID tag or counting/cut chip is now in-synch with the Master Inventory SKU Database. FIG. 3.2.D shows that after encoding, the Master Inventory Tag History Database now contains the unique event of the tag. e.g., the closing of the tag 3.2.E.

The counting/cut chip and the RFI) inlay that share the same tag 5 are "partnered or married (associated)" with each other creating a systemic association linking the counting/cut chip ID with the unique RFID inlay's number for that particular tag 5. This is done so that they are only associated and interact with each other. In this way writing of data or reading of data relative to lock/unlock or cut cable transactions at the tag level can only happen between the corresponding, partnered chip and RFID inlay for that particular tag 5.

The counting/cut chip can include: an onboard or resident memory; an onboard power supply, e.g., a battery or a solar cell for powering a circuit. The counting/cut chip counts locking/unlocking or cut cable sequences; transmits information directly to the master database 15, a receiver or a handheld if the circuit is broken via the cable being cut or the pin being locked or unlocked. It can also transmit information directly to the memory of its paired RFID inlay if the circuit is broken via the cable being cut or the pin being locked or unlocked. As shown in FIGS. 9*a-c*, the on-board power supply 38 allows the RFID tag 30 to transmit counting information to the master database 15 without the need for interrogation of the RFID tag 30. This allows the RFID tag 30 to transmit an open condition to the master database 15 when the RFID tag 30 is being tampered with during a potential merchandise theft. Once the RFID tag 30 transmits an open condition to the master database 15, the master database 15 will determine if the open condition is out of sequence, e.g., an open condition not associated with a sale, and if so, the master database 15 will transmit an alert, e.g., the alert can be a text message to manager that a potential theft is occurring.

Figure 4:
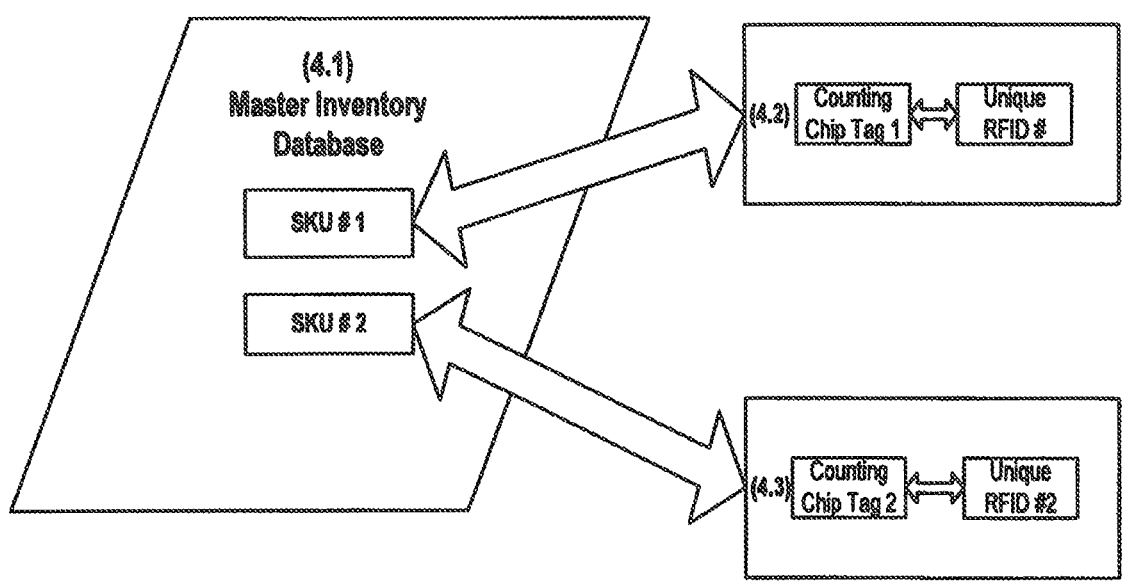
FIG. 4 is illustration of a master inventory database of the present invention.

As shown in FIG. 4, the Master Inventory Database contains information on all SKUs and UPCs and has a direct 1:1 unique relationship with each article of merchandise identified with a unique RFID tag illustrated in 4.2 and 4.3. Each RFID tag contains a unique RFID and unique counting chip that only communicates with each other and has a unique 1:1 relationship with a particular item of clothing. The association of that tag and the item of clothing is exclusive. This means that no other tag can be associated with that article of clothing in the database (4.1).

The tag 5 can be one of the following: (a) the tag incorporates a separate counting/cut chip for writing to the enclosed RFID chip and/or (b) the tag is the RFID hybrid wherein the change in status of the tag (locked or unlocked) is written directly into the memory portion of the embedded RFID chip thus eliminating the need of an additional counting/cut chip. This encoding or commissioning is accomplished by taking user defined data and electronically writing it into the embedded memory of the RFID chip, using either an RFID antenna or other devices such as but not limited to an array of antennas, a handheld RFID scanner device, a RFID capable printer or any other RFID writeable device, (c) the tag is a radio frequency/RF chip 9 for transmitting data directly to a continuously scanning receiver for providing information to the inventory management system. This is done when the chip is energized by a receiver or changes in status.

Figure 2:
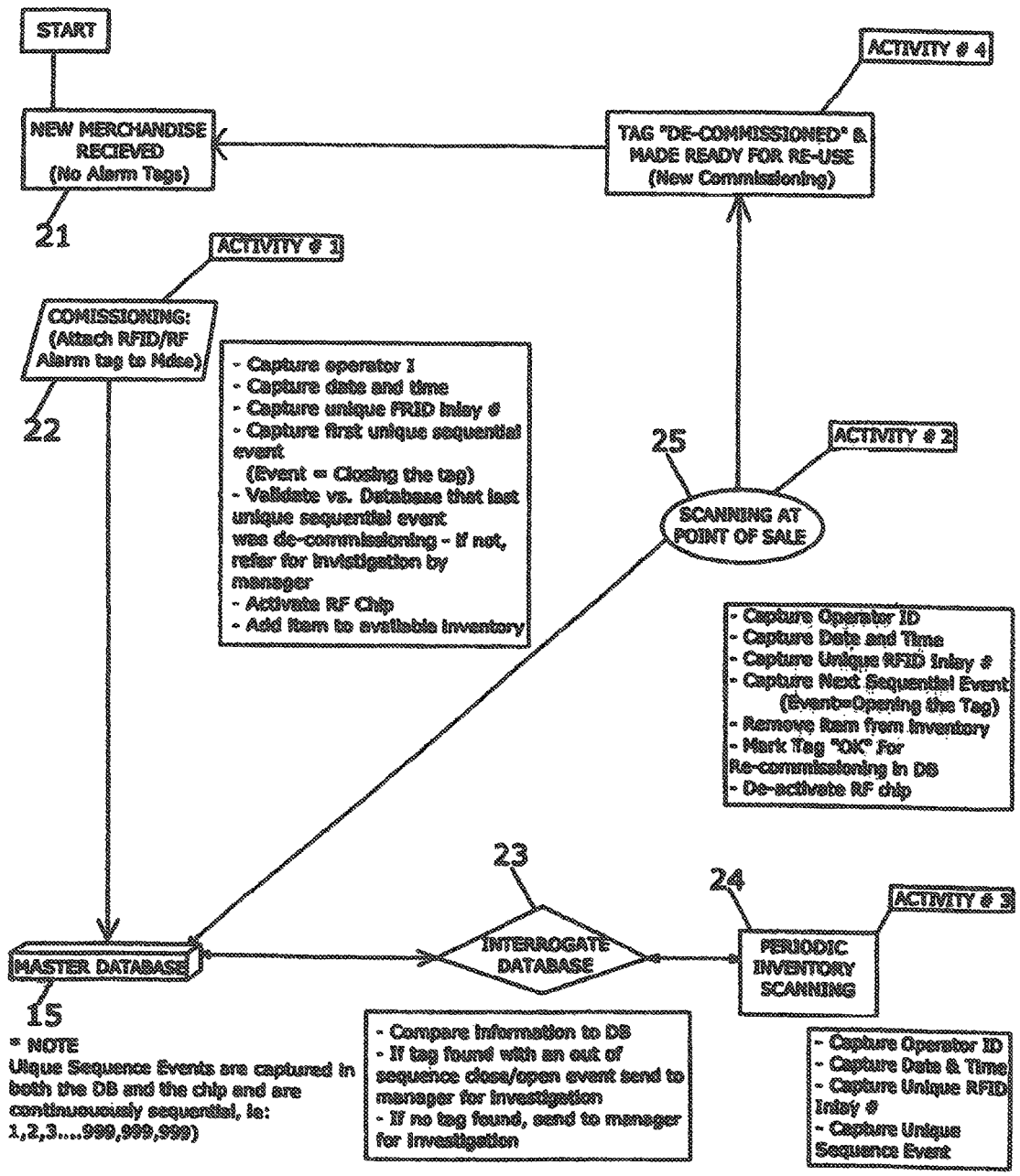
FIG. 2 is a flow chart illustrating the system of the present invention.

The RFID tag 5 communicates via an RF transmitter 9 to a master database 15 (See FIG. 2). The master database 15 stores and can compare the information from the RFID tag 5 with the history of that particular RFID tag 5 to check the number of times the tag 5 has been locked and unlocked. It also compares the data on the tag 5 with the data in the master database 15.

Figure 5:
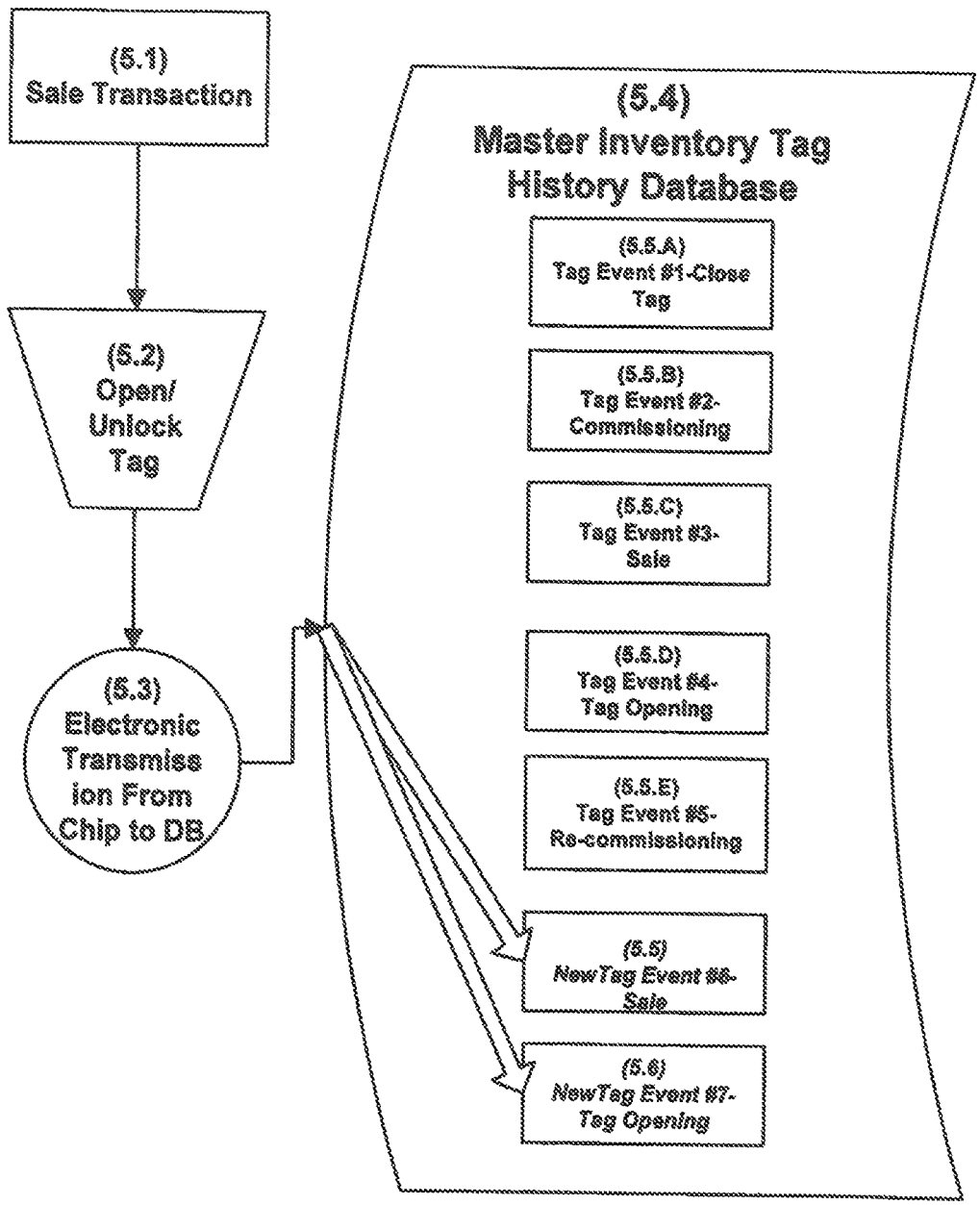
FIG. 5 is illustration of a master inventory tag history database of the present invention.
Figure 6:
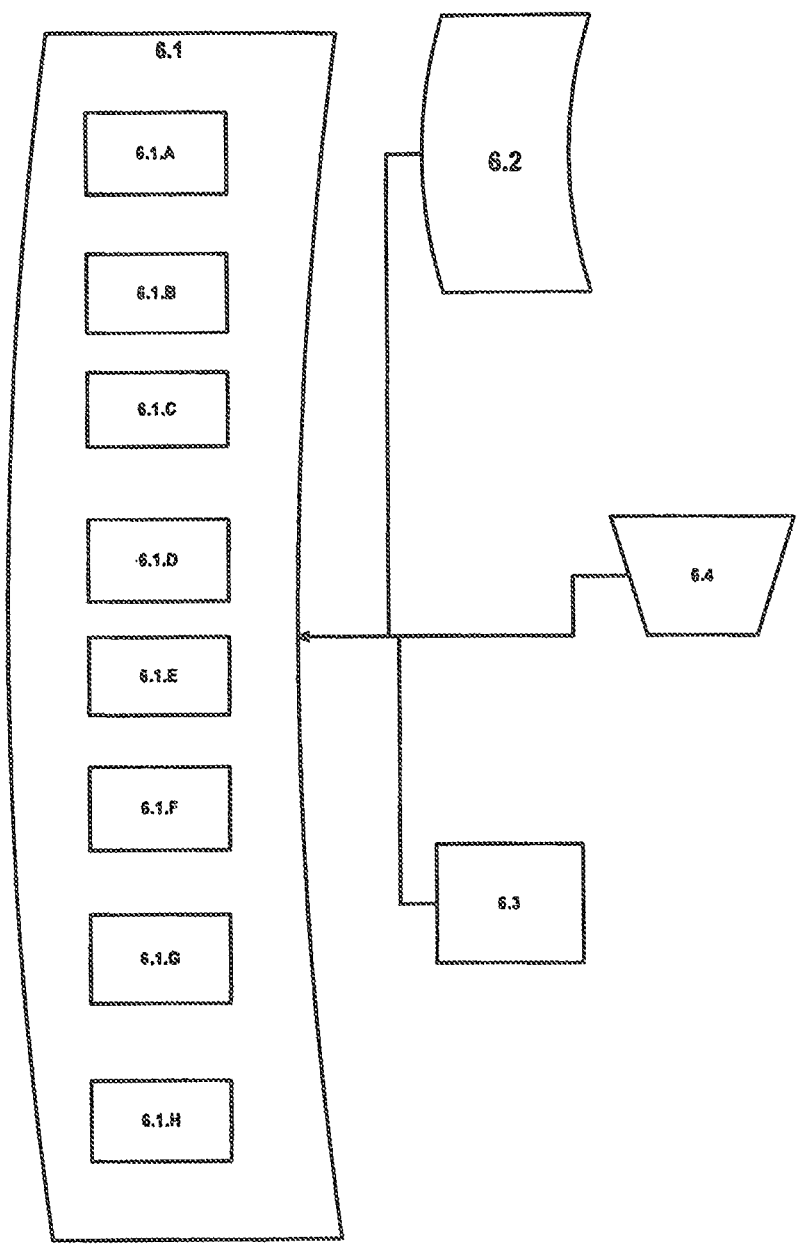
FIG. 6 is illustration of a master inventory tag history database of the present invention.
Figure 7:
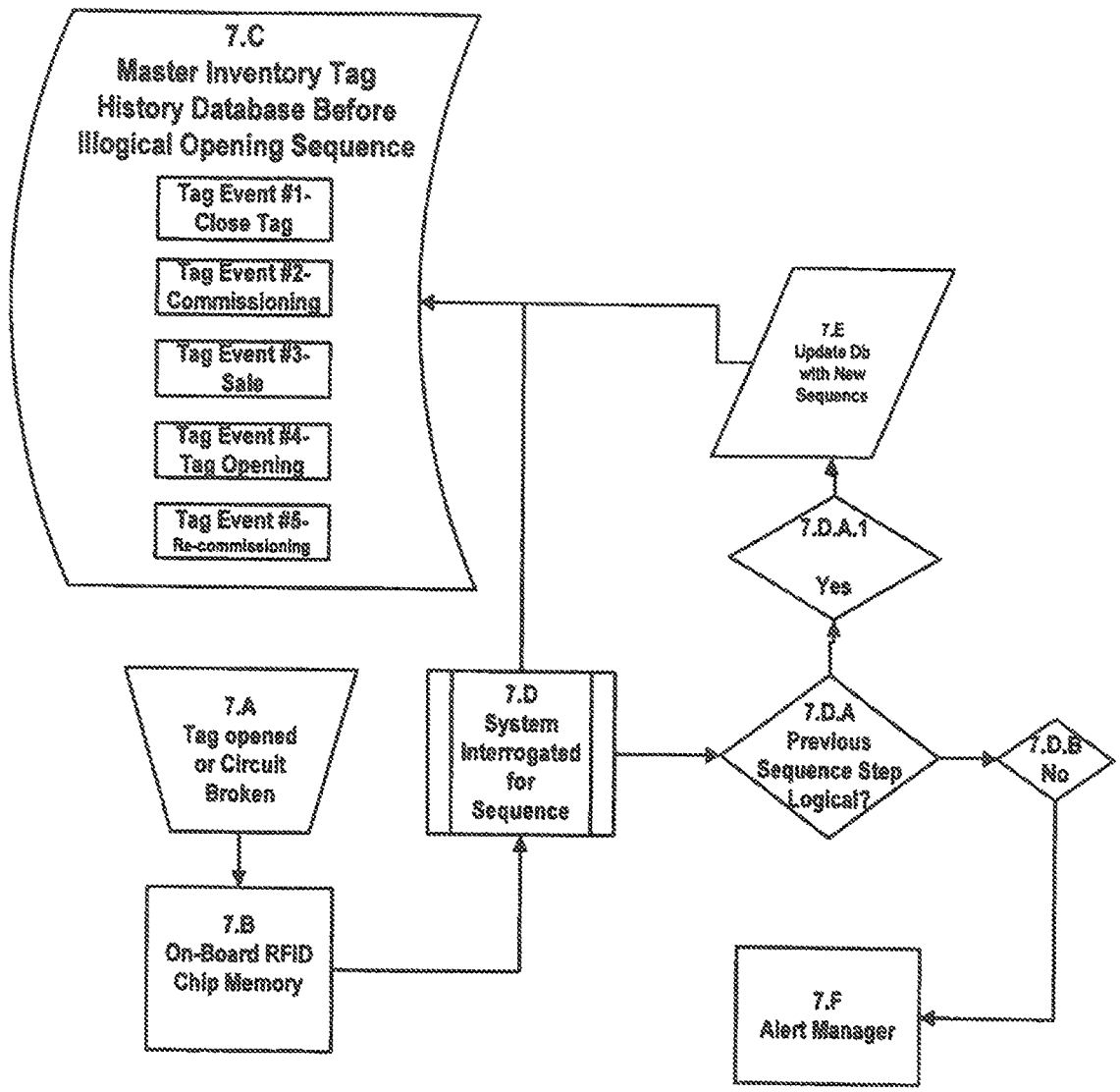
FIG. 7 is a flow chart illustrating an embodiment of the present invention.
Figure 8:
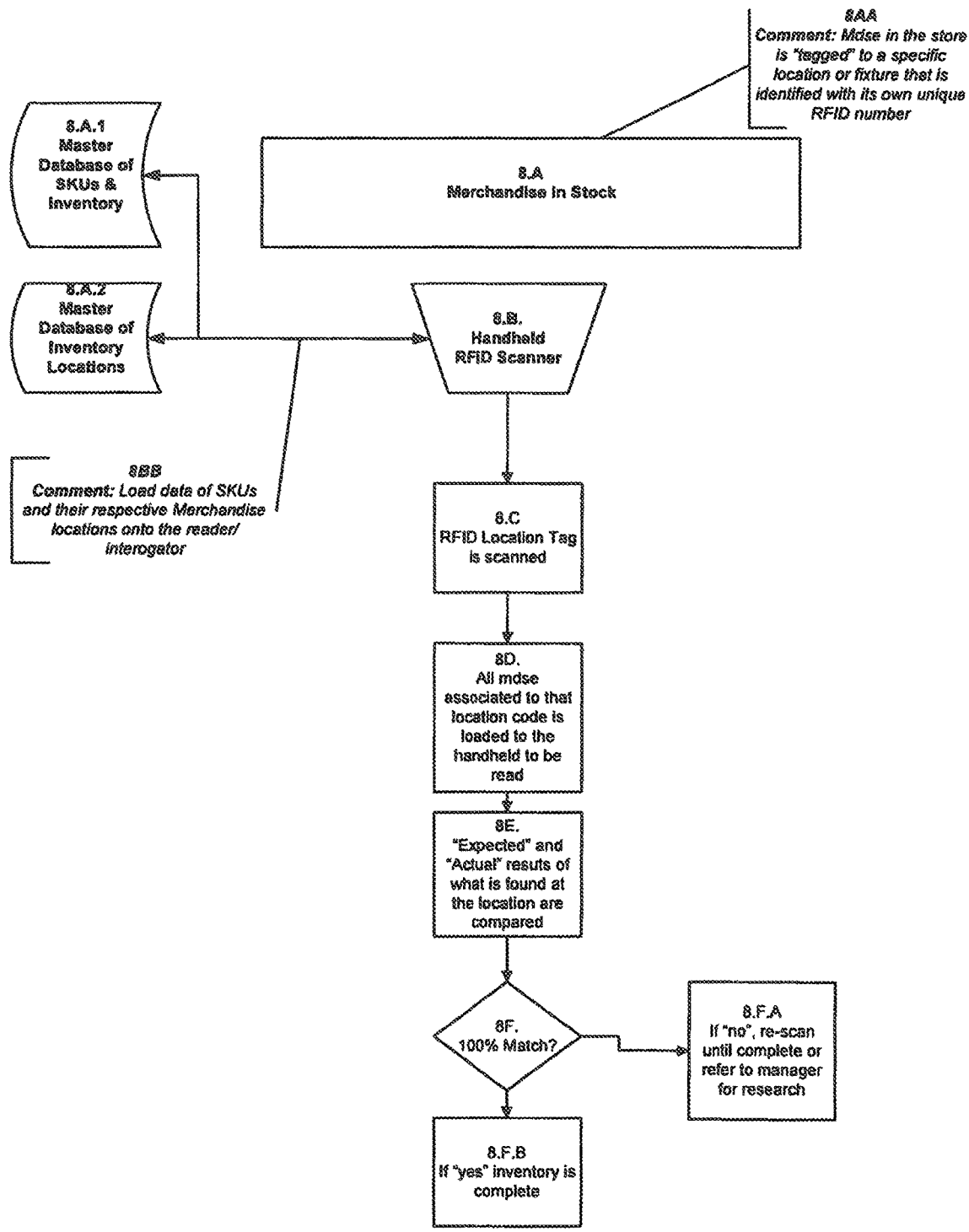
FIG. 8 is a flow chart illustrating an embodiment of the present invention.

As shown in FIG. 5, a sale transaction (5.1) allows the operator to unlock the RFID enabled tag (5.2) which creates an electronic transmission (5.3) to the Master Inventory Tag History Database (5.4) that updates the history for that tag with the event of the sale (5.5) and the opening of the tag (5.6) that are added to the existing sequences of past unique events for this tag: For examples, Tag Event #1—the first closing of the tag. Tag Event #2—the commissioning of the tag. Tag Event #3—the sale of the merchandise associated with the tag. Tag Event #4—the opening of a tag after the sale, Tag Event #5—the re-commissioning of the tag on a new piece of merchandise.

Each time an item of merchandise is sold the tag 5 is retired for that item and then the tag 5 is re-commissioned for a new item of merchandise. In this way the tag 5 is opened to remove it from the sold item and closed for the new item which the tag is now affixed to so that the master data base 15 has a history of this removal and reuse (replacement) for merchandise items in association with that particular tag 5. This POS—point of sale-transaction, accomplished by RFID scan, systematically transmits this data and information to the master database 15. As seen in FIGS. 1A, 1B and 1C each RFID tag 5 has its own unique RFID inlay 7 and either a counting/cut chip or else the change in status of the tag 5 (e.g. locked or unlocked) is written directly into the memory of the embedded RFID chip and no additional counting/cut chip is required.

In the example, prior to a re-commissioning event, the Master Inventory Tag History Database (6.1) contains seven events relative to a specific RFID tag: Tag Event #1: initial close of the tag, Tag Event #2: initial commissioning of the tag to a piece of merchandise, Tag Event #3: a sale transaction, Tag Event #4: The opening of the tag after the sale to remove from the merchandise. Tag Event #5: The re-commissioning/re-use of the tag to a new piece of merchandise, Tag Event #6: The subsequent sale of that merchandise and Tag Event #7: The opening of the tag after the sale.

This information is maintained in the Master Inventory Tag History Database (6.1) as well as the Master Inventory SKU database (6.2) as well as in the resident memory of the RFID tag (6.3). In the example, when the tag is attached to a new piece of merchandise, (6.4) the Master Inventory Tag History Database (6.1) and the Master Inventory SKU database (6.2) as well as in the resident memory of the RFID tag (6.3) are updated with a new unique event (6.1.H) that represents the tag closing and the re-commissioning of that tag onto a new piece of merchandise.

As seen in FIG. 2 the system of the present invention operates as follows: The system 20 receives a new item of merchandise (step 21). The RFID Tag 5 is attached or affixed to this merchandise (step 22). During this step the tag is commissioned (tag is closed, attached or affixed onto a piece of merchandise as described in FIGS. 1A-C and it is paired with the RFID number and SKU as well as an operator ID is captured by the system). The date and time is recorded for that merchandise item when the tag is affixed. The RF inlay is recorded by a systemic transaction which updates the master database 15 such as, by way of non-limiting example, a scan of the RFID chip by an RFID reader scan; the first sequential event is recorded—e.g. the locking of the tag 5 on this item of merchandise; a validation is performed by the master database 15: that the last unique event was a decommissioning of the tag (and if not it is referred for investigation). The chip is then activated and the item is added to the inventory in the master database 15 marking the item as commissioned. If a POS sales transaction associated with the unique RFID chip makes logical equable sense in terms of the locking/unlocking/cut data then no alert is sent for investigation. One such logical sequential sequence would be a prior commissioning event, followed by a sales transaction event, followed by a re-commissioning event, tied to a new item of merchandise. If there was a non-logical sequence, then the item would be referred to the manager to investigate. The physical chip may or may not remain active at all times and available for scanning. The new item is added to the inventory in the master database 15 and is available in inventory.

This illustrates the sequence of events when a tag is opened, or the circuit is broken on a tag. When the system recognizes that a tag is open, (7.A), the on-board RFID chip (7.B) captures the event and reports that back to the Master Inventory Tag History Database (7.C) where the logical sequence of the event is checked versus prior events (7.D), If the sequence is logical (7.D.A) & (7.D.A.1) then the Master Inventory Tag History Database (7.C) is updated with the next sequence event (7.E). If the event is not logical (7.D.A) & (7.D.B), an alert is sent to the Manager (7.F) for further interrogation and review. In other words, if a decommission event (open) occurs before a sales event (open) this sequence would be illogical according to the rules established in the master database. Once an illogical event takes place, a flag is triggered for investigation or review to see why the illogical sequence occurred.

The data base 15 is systematically interrogated (step 23) and compares information from the tag 5 for the new merchandise item 21 with the master database 15. If the tag is determined to be an out of sequence event e.g. the number of opens and closes do not make logical sequential sense, then the item is flagged within the database and the item will require a further security investigation. In other words, the data on the tag 5 is compared with the data in the master database 15 to validate that the locking/unlock sequence makes logical sense using data such as, but not limited to, date, time and prior unique historical events. This further investigation status for the item can be displayed in the master database 15 and can be sent as a report, an email message or an automated cell phone call or text message to the manager to investigate the status of this item. Also if no tag is found, a notification is sent to the manager to investigate by the same aforementioned means. The system is capable of periodic scanning as defined by the user using antenna arrays or hand held RFID scanners or any other suitable devices.

Software for inventory tracking is resident on the RFID handheld, computer, or other device used for inventory. Each display location has a unique RFID location. In the master database, items of inventory are associated 1:1 to that display location. A daily or ad-hoc download of those relationships are loaded into the handheld reader and or other RFID reading device. The scanning operation requires the operator to scan the RFID location tag and then "search" for each of the associated items of inventory. Software within the RFID reader provides either an audio or visual display of items expected to be in that location or as the scan progresses and items are identified, they are dropped off the list viewable on the screen. When all items have been found, the operator is advised as such. Items not found are referred for investigation.

To take inventory of merchandise stock (8.A), subsets of the inventory Master Database of SKUs & Inventory stock (8.A.1) and the Master Database of Inventory Locations (8.A.2) are loaded onto a Handheld RFID Scanner, Computer with Antenna array, etc. (8.B). A location is selected from the Location database and the scanner reads the location code (8AA) for that location (8.C). The merchandise associated with that location code is loaded to the mobile device to be read (8.D) and reading begins (8.E) and compares "expected" results with "actual" results found. If there is a 100% match (8.F), inventory is complete (8.F.B). If there is not a 100% match in step (8.F), the differences between "actual" and "expected" results (8.F.A) are flagged or sent to the manager or any designated employee for research.

(Step 24). Such periodic scanning could be continuous and ongoing, include daily or ad-hoc inventory, weekly inventory, monthly inventory, semi-annual inventory or an annual inventory period. This periodic scanning will capture all the user defined fields on the master database 15 and in the RFID chip as is required to complete all scanning that is required. At a point of sale transaction an RFID scan captures and updates the master database 15 with the user defined unique employee operator ID of the employee performing the sale transaction, the date and time of the transaction, the unique RFID inlay number of the item of merchandise associated with that transaction. The next sequential event e.g. the unlock sequence number.

The captured sale transaction also removes the tag 5 from inventory in the master database 15 and identifies the tag 5 in the master database 15 as being available for re-commissioning. This is accomplished by updating the individual record for that RFID tag 5 as being "sold" and available for re-commissioning or reuse, and thus permitting the unique number of the RFID tag 5 to become associated with another item of merchandise in the master database 15 (step 21). Thus the present invention provides for an inventory and antitheft alarm tag utilizing RFID technology providing for either real time or time of scan inventory and theft control while monitoring the time and date of each locking/unlocking event and the sequence of these events.

Figure 10:
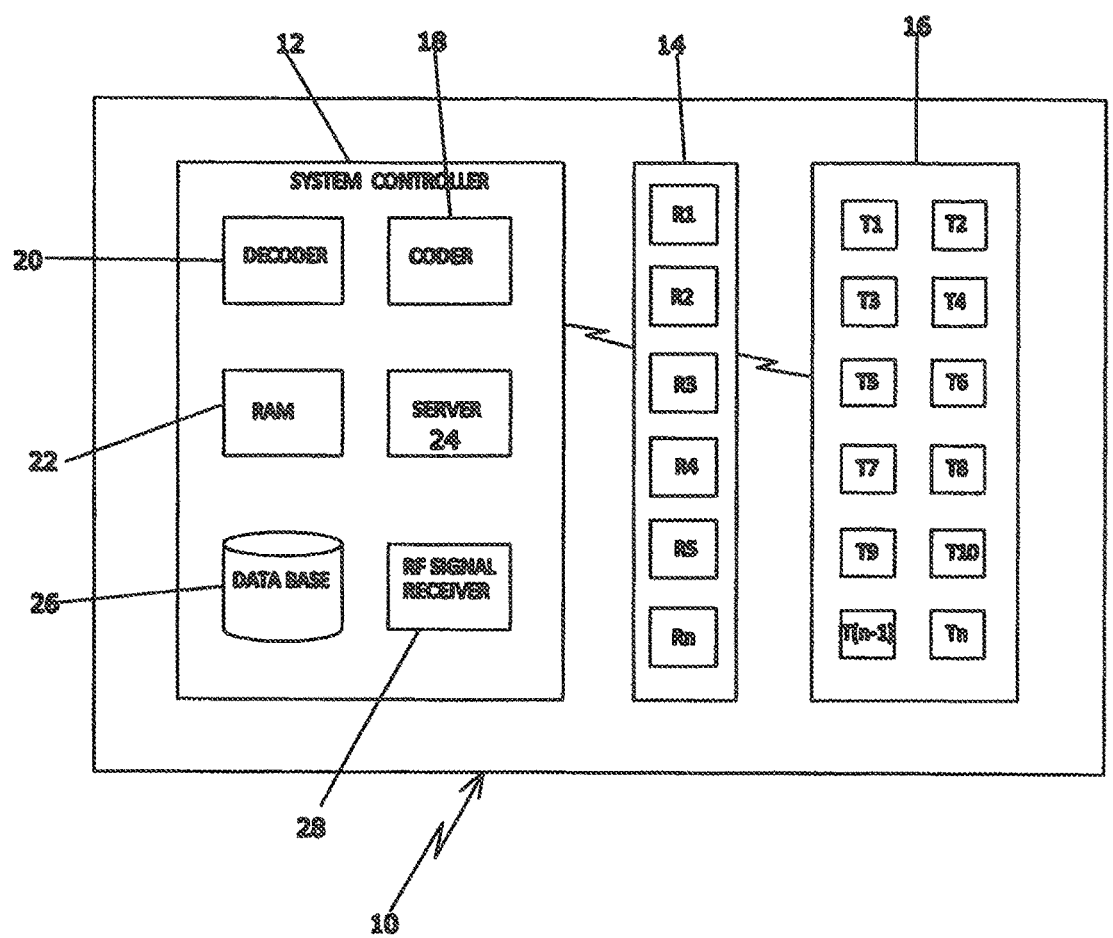
FIG. 10 shows a security tag with RFID capability merchandise management system in accordance with a preferred embodiment of the present invention.

In another embodiment, referring to FIG. 10, a security tag may be part of an RFID device based merchandise management system 110. The system 110 includes a system controller 112, a plurality of RFID readers 114, and a plurality of RFID security tags 116. Controller 112 includes a coder 118, a decoder 120, a RAM 122, a server 124, a data base 126, and a receiver 128. The system 110 includes a number of RFID readers 114 that communicate with controller 112 and RFID security tags 116. Each of the RFID readers 114 communicates with the system controller 112 and the RFID security tags 116. The RFID system may be connected through a network to the controller with internet or intranet that is either wireless or a wired net.

The coder 118 and decoder 120 have the ability to create a code for the RFID security tag 16 and to decode signals received from the RFID security tags 116 respectively. The coder 118 creates an identification number or pin for each of the RFID security tags 116. These identification pins are stored in the RFID tags 116 through the reader. The RAM 122 coordinates with the server 124, coder 118, decoder 120, and database 126 to temporarily store information received in the system 110.

The server 124 is a computing system that contains a computer program that coordinates the system management. The database 126 stores information related to each of the readers 114 and each of the RFID security tags 116. The database 126 provides required information to generate reports by the system 110.

Figure 11:
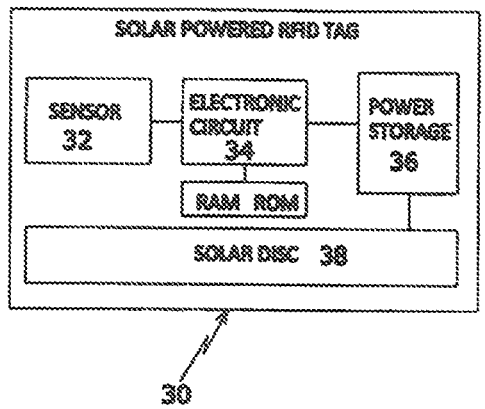
FIG. 11 shows a security tag with RFID tag of the merchandise management system of FIG. 9.

Now referring to FIG. 11, the RFID security tag 130 in accordance with the present invention includes a display 131, a sensor 132, a circuit 134, power storage 136, and a solar panel 138. The display 131 is preferably an electronic display that shows the price of the item associated with security tag 130. The sensor 132 sends and receives wireless signals to controller 112 (FIG. 10). The circuit 134 stores the identification code of the tag and coordinates with the signals received from the controller 112 (FIG. 9). The circuit 134 stores, displays, and edits the code associated with the tag.

The tag may include a solar panel 138 that provides energy to the circuit 134. The tag may have an antenna to transmit and receive wireless signals. The RFID circuit communicates with any external device, such as, a controlling unit, an RFID reader, that can read the sensor through radio frequency signals. The solar powered RFID security tag 130 in accordance with the present invention is preferably used to identify a remotely located object, such as, any merchandise through wireless transmission of signals.

The RFID reader 114 (FIG. 10) reads an identification code associated with the solar powered RFID security tag 130 that is communicated to the controller 112 (FIG. 10). Reader 114 is a device that includes sensors, power storage, digital display, a processor and memory chips. Reader 114, through the sensors identifies one or more security tags 116 in close proximity with reader 114. Reader 114 has ability to send and receive signals to controller 112 and security tags 116. The display of reader 114 is a screen that displays details of tags and controller 114. The controller 112 (FIG. 10) has a database 126 (FIG. 9) that includes data which includes the information of the merchandise associated with the respective RFID security tag. Similarly the data base 126 (FIG. 10) includes other attributes of the merchandise such as price, date of purchase, name of supplier, date of delivery, customer information etc.

In use, the security tag's information is stored electronically in a non-volatile memory. If a product is bought near the exit of a store, an RFID reader transmits an encoded radio signal to interrogate the tag via a small RF transmitter/receiver. Once the tag receives the message, the tag responds with its identification information. This may be a unique tag serial number, or may be product-related information such as a stock number, lot or batch number, production date, or other specific information. If the product is brought within a certain distance from the exit, an alarm will sound on the RFID reader.

Figure 12:
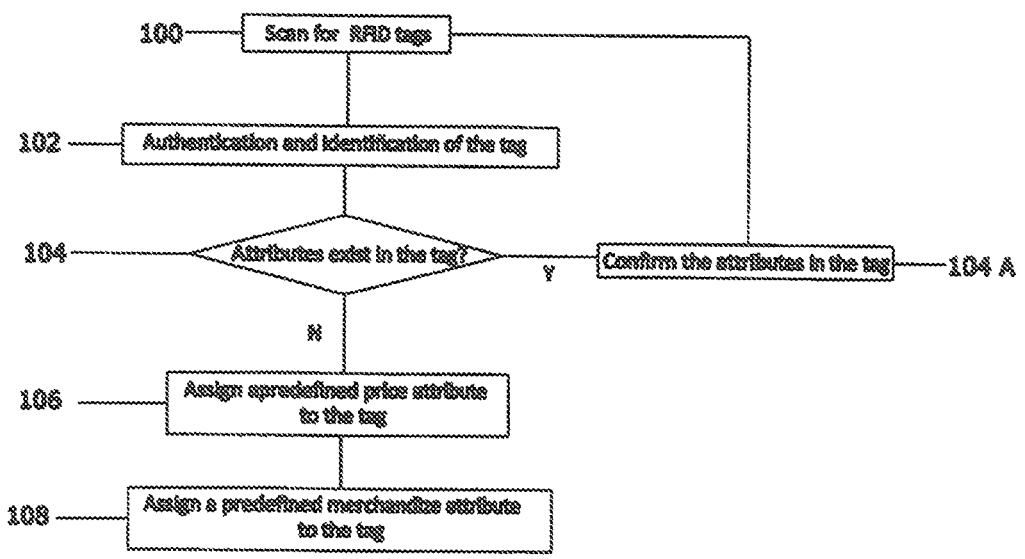
FIG. 12 is flow chart that shows steps involved in a process for assigning merchandise to RFID security tags in accordance with the present invention.

As shown in FIG. 12, steps involved in the process of assigning attributes, such as, price, type, supplier, date of delivery, type of merchandise etc. to an RFID security tag in accordance with the present invention are described. First, step 100, the reader scans for a solar powered RFID security tag in close vicinity with the reader. Second, step 102, the reader authenticates the RFID security tag by checking the identification code of the RFID security tag with a list of pre-issued identification codes of the tags.

Third, step 104, the reader communicates with the system 110 to check the attributes assigned to the tag by the system. If the attributes are already assigned to the tag then the attributes are cross checked with the data associated with the system (104A) and control goes back to the first step 100. If the tag has no attributes assigned then the control goes to a next step 106. In a next step 106, a predefined price is assigned to the RFID security tag. In a next step 108, a predefined merchandise is associated with the RFID security tag and the database is also updated accordingly.

Figure 13:
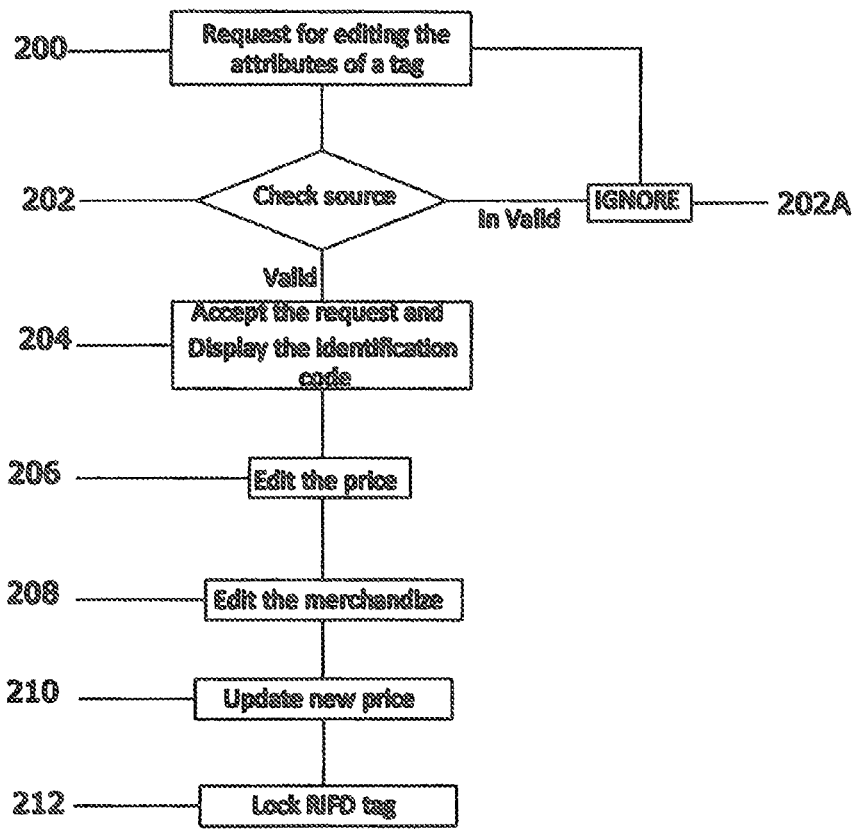
FIG. 13 is flow chart that shows steps involved in a process for RFID security tags in accordance with the present invention.
Figure 14:
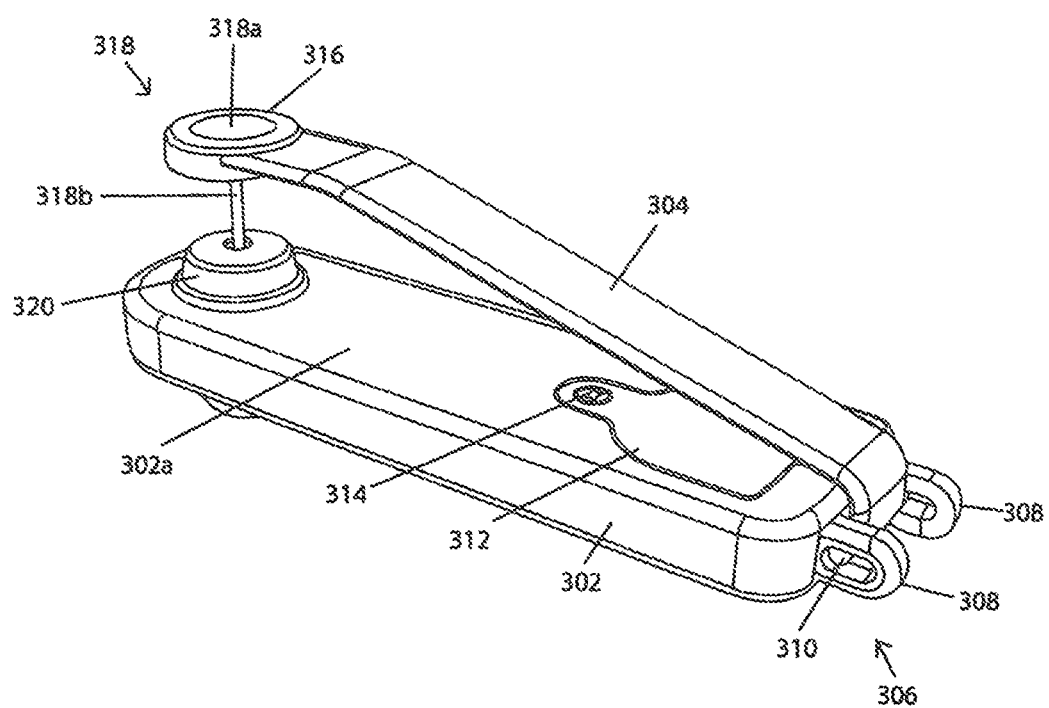
FIG. 14 is a front perspective view of a security tag of the disclosed technology.

Referring to FIG. 13, steps involved in a process of controlling the attributes of RFID security tag in accordance with the present invention is described. In a first step 200, the system 110 receives a request to edit the attributes associated with a RFID security tag. In a second step 202, validity of the request is checked. In this step 202, the source of the request is checked. If the source is an authorized source then the request is honored. If the request is not valid then the request is ignored (202A). In a next step 204, the valid request is accepted and the unique ID in the tag is displayed. In a next step 206, a request to change the price is accepted. In a next step 208, the merchandise associated with the RFID security tag is displayed for confirmation. In a next step 210, the new price is reconfirmed to update the new price. Then, in 212, the RFID security tag is locked.

In operation, the system 110 of the present invention includes a plurality of RFID tags which may be solar powered 116, and the identification number of each of the tags 116 is entered in the database 126 of the merchandise system 110. Each of the RFID security tags 116 is associated with required merchandise attributes such as the type of merchandise, source, date of arrival, price, discount, inventory identification number etc. Initially there is no attribute associated with the security tag 116. System 110 assigns required data as per the requirement.

The solar powered RFID security tags 116 of the present invention communicate with the system 110 through preferably the readers 114. The system 110 includes a plurality of such readers 114. The readers 114 are connected to the server 124 either through an intranet or through the internet. One reader 114 may exchange data with more than one tag 116. The attributes such as price assigned to a tag 116 and thereby to merchandise is advantageously remotely changed through the system 110. However, only authorized requests to the system 110 are honored. Any unauthorized request to change the attributes associated with a tag 110 is ignored by the system 110. An unauthorized user request may come from an unauthorized reader. These unauthorized readers may unlawfully allow a shop lifter to gain access to the circuitry of the RFID tag and change certain attributes, e.g., shutting off the security feature or changing the price on a tag. The above system compensates for this by verifying the RFID security tag by checking the identification code of the RFID security tag with a list of pre-issued identification codes of the tags and verifying that the reader asking for this request is part of the system and has system controller access rights.

A preferred process of changing price of the RFID security tag 110 in accordance with the present invention is described. A reader 114 is brought in close proximity with desired merchandise to identify the security tag 114 associated with that Merchandise. Reader 114 then scans and provides the data of the security tag 116 to controller 112 for authorization. On authorization, the reader 114 allows the authorized user to access the information and displays the attributes such as price, make etc. associated with the merchandise. The reader device 114 now allows the user to access the edit mode of the controller 112. Then the user changes the price of the merchandise associated with the security tag using the reader 114.

A user, preferably, an administrator of the controller has right to remotely change the price displayed on the security tag associated with the merchandise. The controller 112 sends signals to all of the readers to identify a security tag having a predefined identification code. All readers 114 send signal in their proximity to find and identify the requested security tag. The reader that is able to gather and identify the requested tag sends the signals along with the requested data back to the controller. The user changes the price of the merchandise by changing the price associated with the tag 116.

Readers 114 are positioned at various exit doors and other locations. Reader scans the merchandise being taken out from the store. The controller 112 rings a theft alarm if any merchandise is taken out from the store without making the payment. Readers 114 are placed at various locations in the store such as windows, ventilators to avoid any theft from the store.

The merchandise is arranged in the stores at various locations. Each item of the merchandise is assigned to one tag. When a customer brings any item on the payment counter, a reader on the counter identifies the tag, and the merchandise associated with the tag. The attributes of the tag, such as the price, item type and item number associated with the tag that is fed to the billing system.

The solar powered tags use the solar energy to power of the circuit and memory of the tag. The use of solar power is aimed at avoiding any chance of malfunctioning due to unavailability of power in the RFID tag. A more secure tag leads to more accurate inventory management and decreases the chance of theft.

In another implementation, as shown in FIGS. 14-24, the RFID tag system can include an inventory and anti-tamper tag 300 that can provide real time, near-real time or time of scan inventory in combination with anti-tamper circuitry, as described above and below. The inventory and anti-tamper tag 300 can include a body 302 and an attachment lever 304. The attachment lever 304 can be connected to the body 302 by a hinge 306. The hinge 306 can include two U-shaped holders for receiving projections 310 located on a first end of the attachment lever 304. On the second end of the attachment lever there can be located a pin holder 316 for receiving pin 318. The pin 318 can have a head 318a and a body 318b. The body 318b of the pin 318 can be received by a clutch mechanism 320.

As shown in FIGS. 19-22, the closing of the tag 300 can be accomplished by inserting the pin body 318b into a pin receiving hole 316c located at the center of the pin holder 316 on the attachment lever 304. The tip of the pin body 318c can then be aligned with opening 335 of the clutch assembly 320. To lock the attachment lever 304, the attachment lever 304 is moved in direction A so that a bottom side 316b of the pin holder 316 can make contact with a receiving mechanism 322 of the clutch assembly 320. The pin is then inserted fully into the retaining mechanism 330 of the clutch assembly 320 and is locked in place by retention arms of the retaining mechanism 330.

Figure 15:
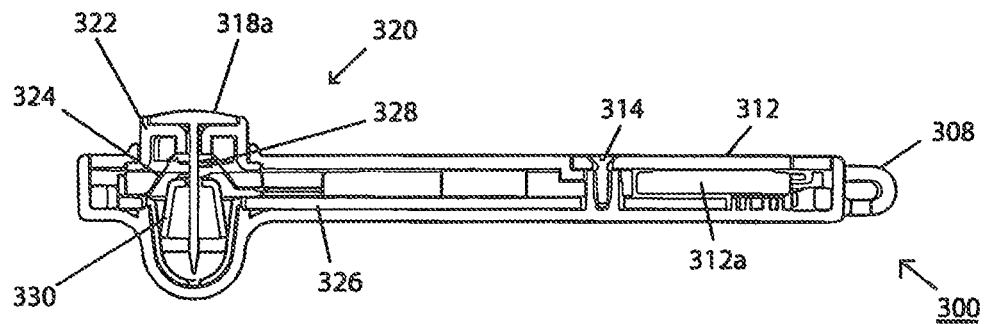
FIG. 15 is a side, sectional view of the security tag of the disclosed technology.
Figure 17:
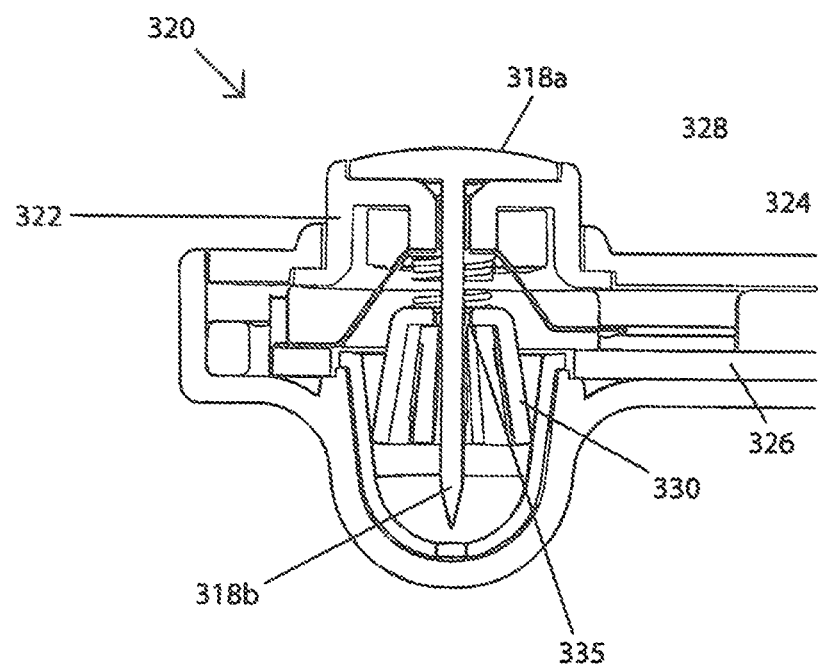
FIG. 17 is a sectional, close-up view of the locking mechanism of the security tag of the disclosed technology.
Figure 18:
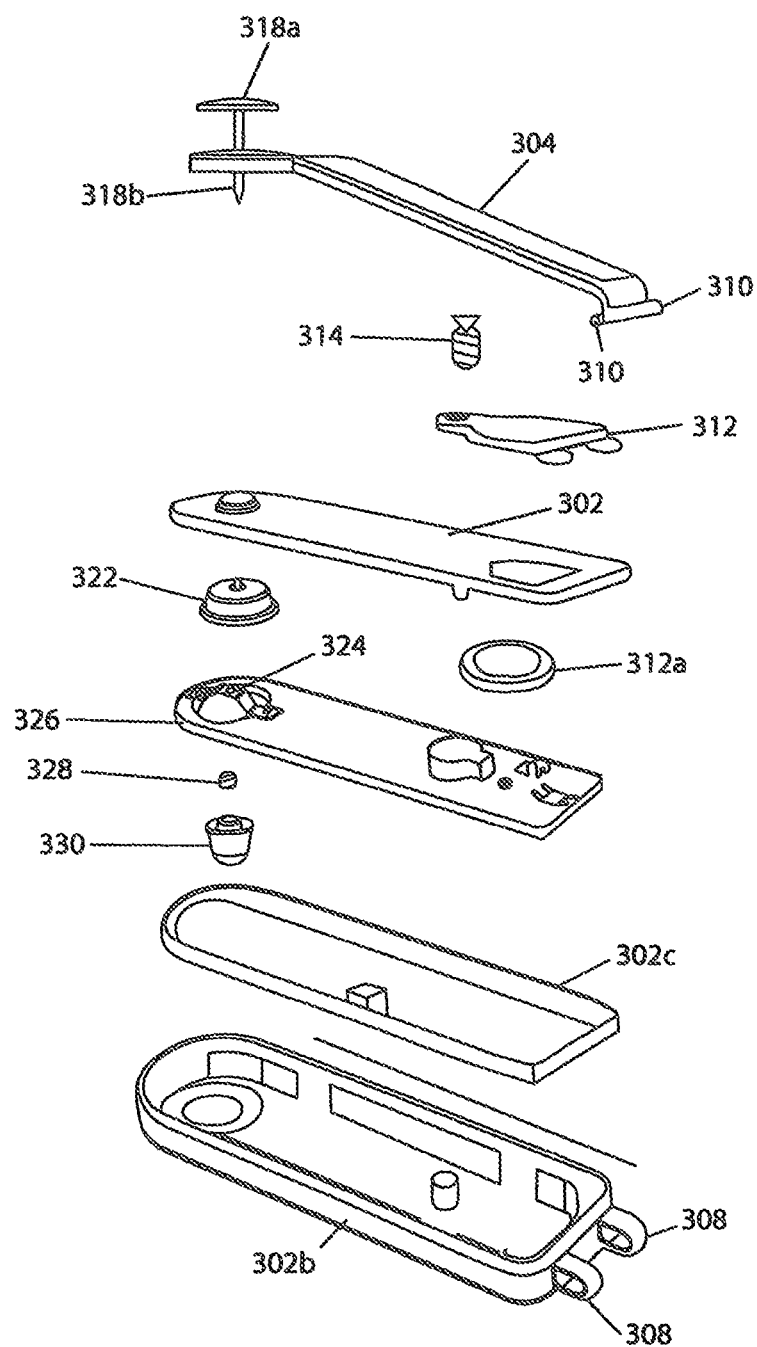
FIG. 18 is an exploded perspective view of a security tag of the disclosed technology.
Figure 19:
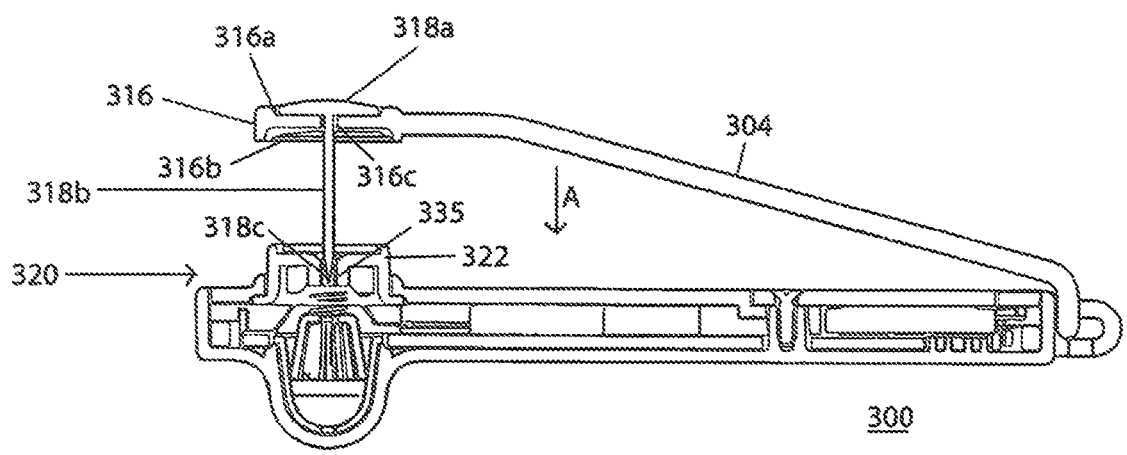
FIG. 19 is a side view of a security tag of the disclosed technology.
Figure 20:
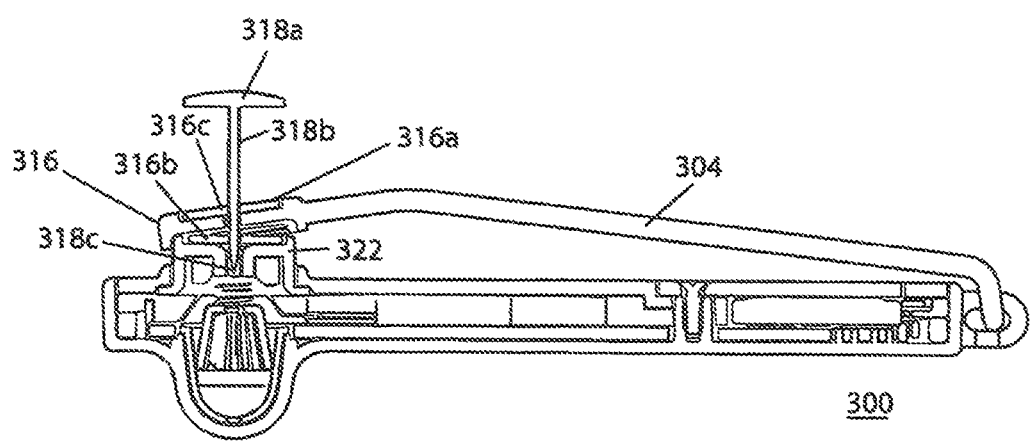
FIG. 20 is a side view of a security tag of the disclosed technology
Figure 21:
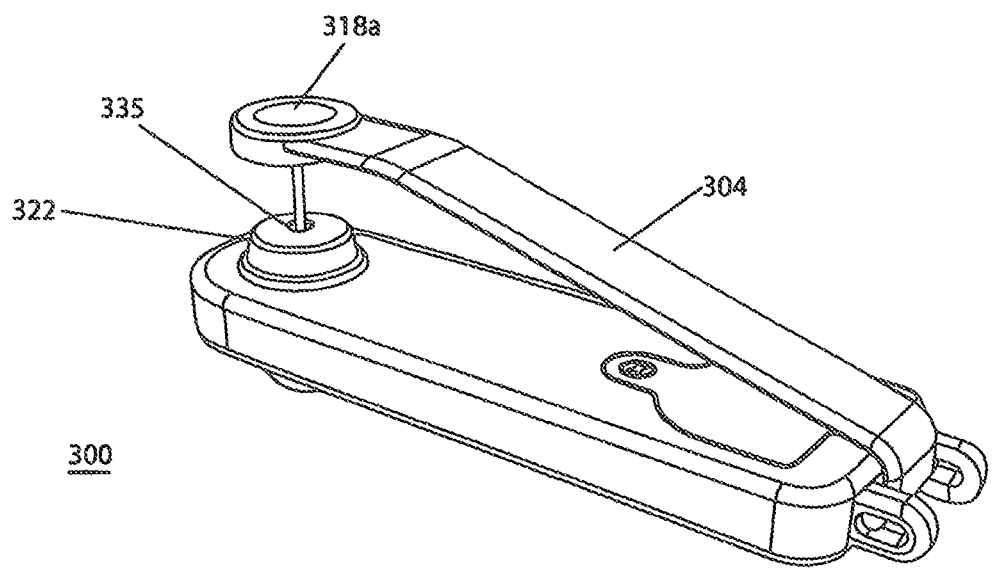
FIG. 21 is a perspective view of a security tag of the disclosed technology.
Figure 22:
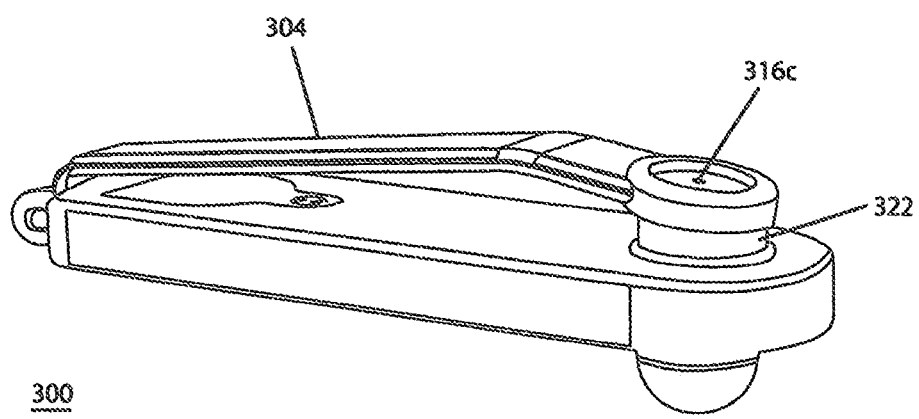
FIG. 22 is a perspective view of a security tag of the disclosed technology.

FIG. 15 shows a cross-sectional view of tag 300 with a pin 318 inserted and the attachment lever 304 unattached. The front portion of the tag 300 includes the clutch mechanism 320. As shown in FIG. 17, the clutch mechanism 320 can include a receiving mechanism 322, an electrical conductor 324, a spring 328, an opening 335 and a retaining mechanism 330. The electrical conductor 234 can be removably coupled to a component board 326. Once the attachment lever of the tag is secured in a locked position, the electrical conductor is brought into electrical contact with the component board 326 and the tag 300 is put into an active locked state, described below.

Figure 16:
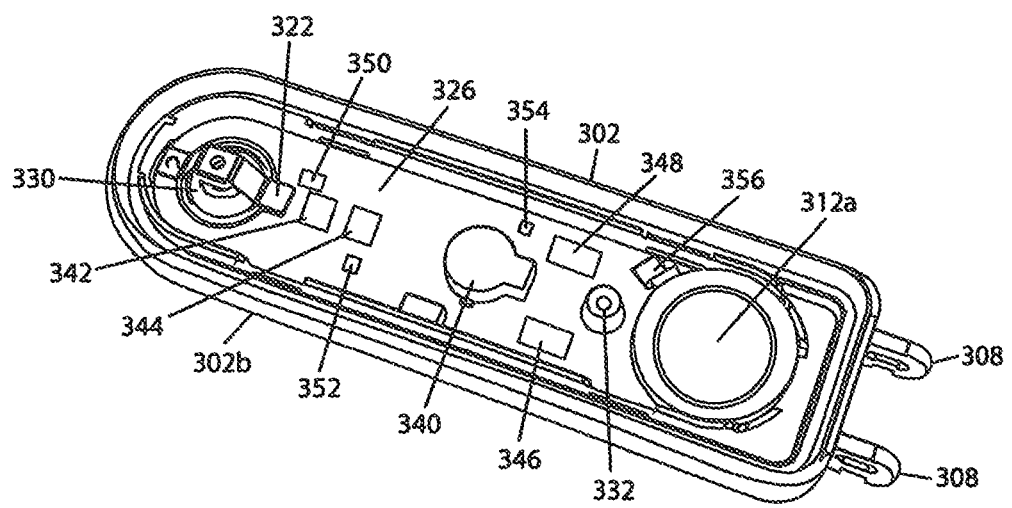
FIG. 16 is a top perspective view of the security tag with a top removed of the disclosed technology.

As shown in FIG. 16, the component board 326 can include an RFID chip 340 with transmitter/receiver, a 433 MHz uhf transmitter/receiver 342, a programmable chip 344, an on-board memory 346, a counter 348, a tamper assembly 350, a display 352, an auditory alarm 354 and battery connectors 356.

The programmable chip 344 can be a programmable UHF EPC GEN 2 chip which can enable the tag to have one or more of the following capabilities: a. transmitting capabilities, b. price updating capabilities and c. tamper capabilities, e.g., recognizing: the cutting of the pin or cable, the removal of the magnetic connector or the cutting of the body at any location on the tag.

The RFID chip 340 can be wireless and use electromagnetic fields to transfer data, for the purposes of automatically identifying and tracking tags attached to merchandise. The chip 340 can be connected to the on-board memory 346 for electronically storing information. In some implementations, the RFID chip 340 can be powered by electromagnetic induction from magnetic fields produced near readers. In other implementations, the RFID chip 340 can collect energy from the interrogating radio waves and act as a passive transponder. In other implementations, the RFID chip 340 can be connected to a local power source, e.g., a battery. These RFID chips are classified as passive, active or battery-assisted passive.

An active chip has an on-board battery and periodically transmits its ID signal. A battery-assisted passive (BAP) chip has a small battery on board and is activated when in the presence of an RFID reader. A passive chip has no battery and uses the radio energy transmitted by the reader. However, to operate a passive chip, it must be illuminated with a power level roughly a thousand times stronger than for signal transmission. That makes a difference in interference and in exposure to radiation.

Chips can be read/write chips where object-specific data can be written into the chip by a system user. RFID chips contain at least two parts: an integrated circuit for storing and processing information, modulating and demodulating a radio-frequency (RF) signal, collecting DC power from the incident reader signal, and other specialized functions; and an antenna for receiving and transmitting the signal. The tag information can be stored in a non-volatile memory. The RFID chip can include either fixed or programmable logic for processing the transmission and sensor data, respectively.

An RFID reader transmits an encoded radio signal to interrogate the RFID chip. The RFID chip receives the message and then responds with its identification and other information. This may be only a unique tag serial number, or may be product-related information such as a stock number, lot or batch number, production date, or other specific information. Since RFID chips have individual serial numbers, the RFID system can discriminate among several tags that might be within the range of the RFID reader and read them simultaneously.

Separate from the RFID chip, the tag 300 can contain the 433 MHz uhf transmitter/receiver which functions on a different frequency than the RFID chip. The 433 MHz uhf transmitter/receiver can trigger real-time or near-real-time alerts about every opening, closing and tampering of a tag by communicating with the master computer over the RFID tag system.

The 433 MHz uhf transmitter/receiver can also receive and confirm price changes, SKU changes, product description changes and any other change to the on-board memory from the master computer.

Figure 25:
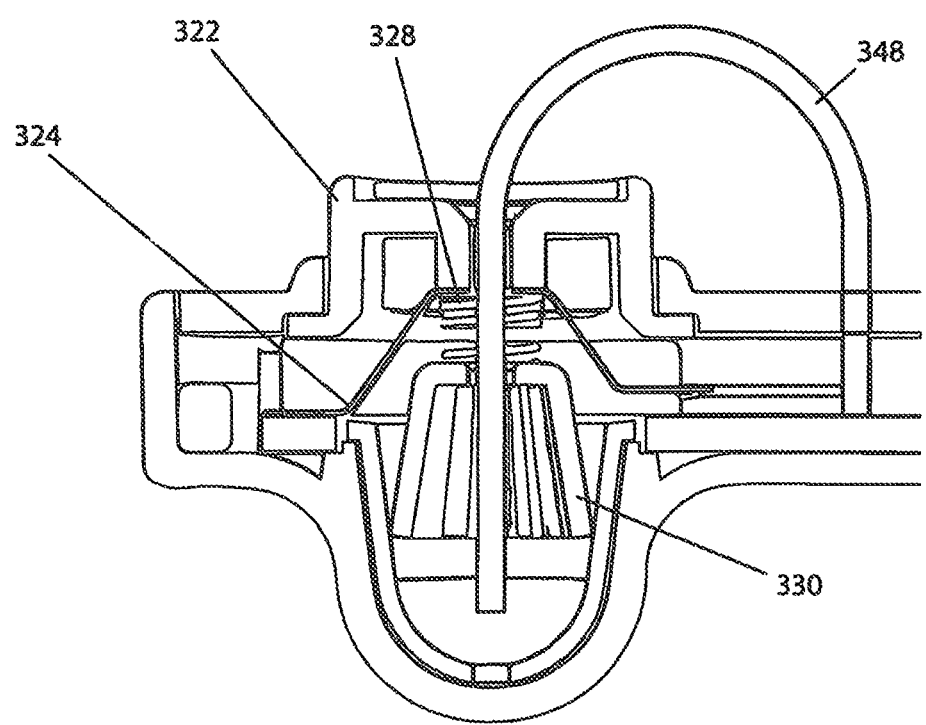
FIG. 25 is a sectional, close-up view of the locking mechanism of the security tag of the disclosed technology.
Figure 26:
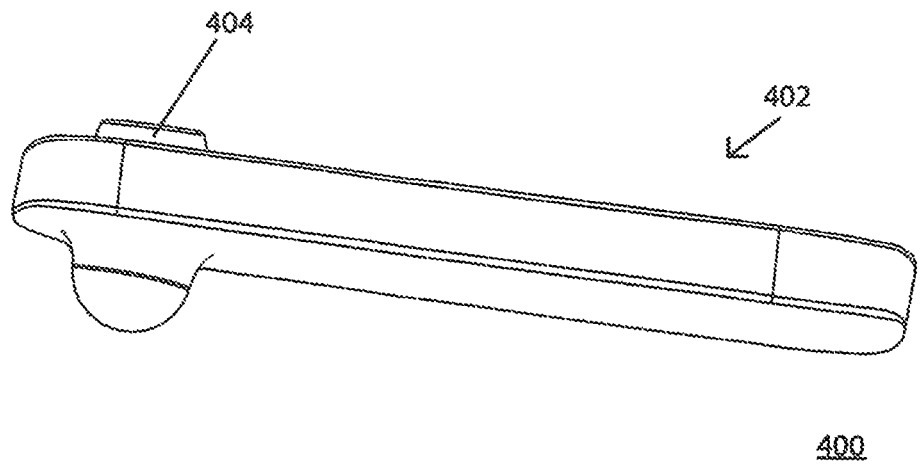
FIG. 26 is a side perspective view of a security tag of the disclosed technology.
Figure 27:
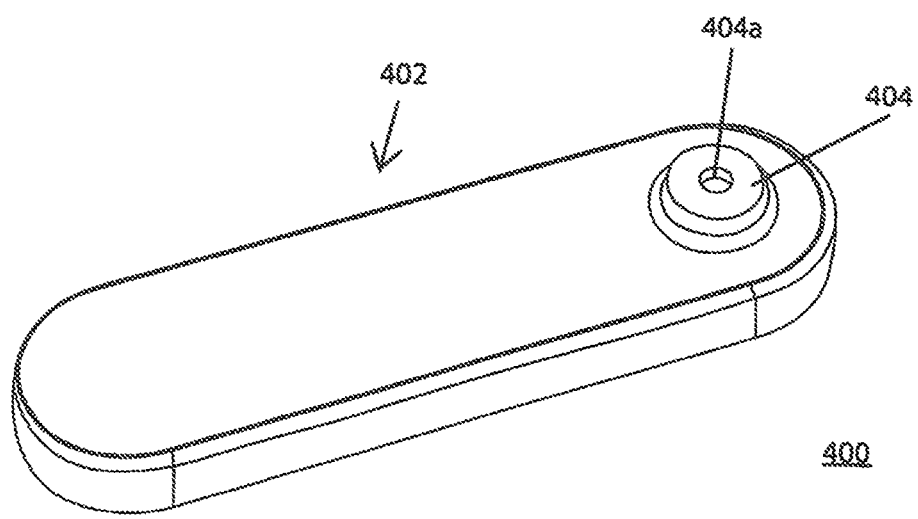
FIG. 27 is a top perspective view of a security tag of the disclosed technology.

The tag 300 can further include a counter 348. The counter 348 can keep track of sequential events using sequence numbers that increase by "1" every time the pin 6 is inserted or removed from the clutch mechanism 320 or, as shown in FIG. 25, a cable is removed from the clutch mechanism 320. A log of such events can also be stored in the on-board memory and/or in the master computer.

In use, the insertion or removal of the pin or cord into the insertion opening 335 connects or breaks the electrical continuity of the circuit. Every time the event sequence number changes, caused by a locking or unlocking event or a cut cable, the counter 348 can transmit the updated sequence number to the 433 Mhz uhf transmitter/receiver 342 for transmittal to the master computer. If the pin is removed, the cable is cut or the circuit is broken, the circuit triggers a sequence event to the counter 348. The counter 348 can also determine the current state of the tag, e.g., opened or closed, if interrogated to do so.

In some implementations, the RFID tag can include a tamper assembly 350 communicatively coupled to a pressure sensor 333 that surrounds the locking opening 335. That is, if there is an undue amount of force applied to the pin 318 or clutch assembly 320, e.g., a force greater than one pound, the pressure sensor 333 triggers an open condition within the counter 348. The counter 348 can then transmit the open condition to the master computer and the master computer can determine if the open condition is out of sequence or in-sequence. If out of sequence, the master computer can trigger an alert signal, e.g., an alert can be sent to store personnel that a theft of merchandise may be occurring.

The tag can also include a display 352 for displaying information about the article it is attached, e.g., price, SKU, number of items in inventory, available sizes in inventory, etc. The display can be an LCD or an electronic paper display (EPD). An EPD is an electrically-charged surface that replicates the look and experience of ink on paper. EPDs are extremely thin and only require power when a new image is requested. Instead of a LCD display that uses backlighting to illuminate pixels, an EPD is based on the scientific phenomena known as "electrophoresis," the movement of electrically charged molecules in an electric field. That is, molecules are encapsulated and applied to a substrate, e.g., the encapsulated "ink" can be printed onto a sheet of plastic film that is laminated to a layer of circuitry. The circuitry forms a pattern of pixels that can be controlled by a display driver.

In some implementations, the RFID tag can include an auditory alarm 354 and if the tag is breached a buzzer can be activated to alert of the breach. The auditory alarm 354 can also be used to signal to a user that the tag is in a locked position when going from an unlocked position to ensure proper contact was made.

The tag can have an on-board battery 312a or some other power source, e.g., solar power, connected to circuit board with connectors. The battery 312a may be connected to circuitry for notification of a battery going down to activate for replacement.

Figure 23:
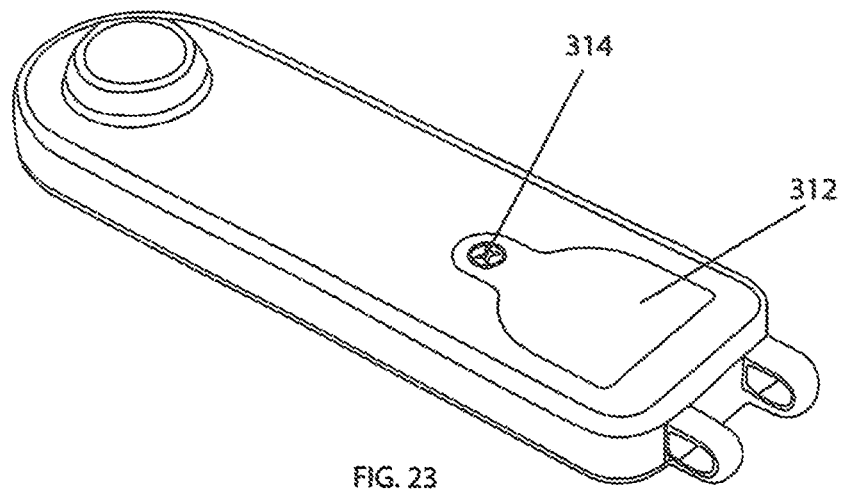
FIG. 23 is a bottom perspective view of a security tag of the disclosed technology.
Figure 24:
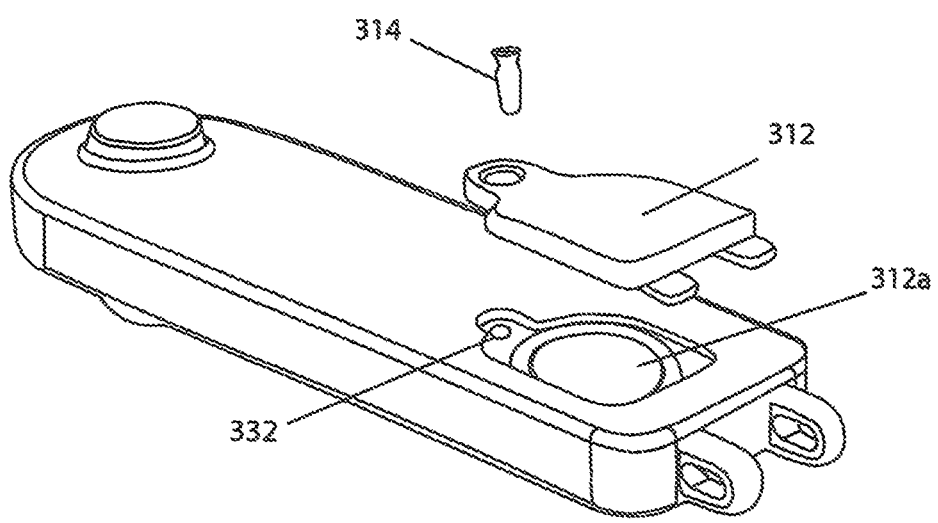
FIG. 24 is a bottom perspective view of a security tag of the disclosed technology.

The changing of the battery is done when tag is in an open state. As shown in FIGS. 23 and 24, on a top side 302a of the body 302, a battery cover 312 can be located held in place via an attachment screw 314. The power source can monitor the locking unlocking and the integrity of the circuit to make sure the line was mot broken or the pin cut. If the battery is removed there can be a capacitor with enough power to send an alert to the master computer.

In another implementation, shown in FIG. 25, a cable can be used in place of a pin. The cable can have an electrical connection so that if the cable is cut an alarm can be triggered. For example, detecting if someone attached an extension to the cable and then cutting it in the middle.

Please note that the above described tag can be implemented using a combination of the above features. For example, the tag can include (1) tamper circuitry, an EPD and a 433 MHz uhf transmitter/receiver, (2) tamper circuitry and a 433 MHz uhf transmitter/receiver, (3) tamper circuitry and an EPD or (4) tamper circuitry without an EPD or a 433 MHz uhf transmitter/receiver.

In some implementations, the register/inventory system can be incorporated with a locking assembly that can be locked remotely from the server side.

In another implementation, as shown in FIGS. 26-33f, the RFID tag system can include an inventory and tamper tag 400. The inventory and tamper tag 400 can include a body 402 and a pin receiver 404 for receiving a pin 406. The pin 406 can have a head 406a and a body 406b. The body 406b of the pin 406 can be received by a clutch mechanism 320.

Figure 29:
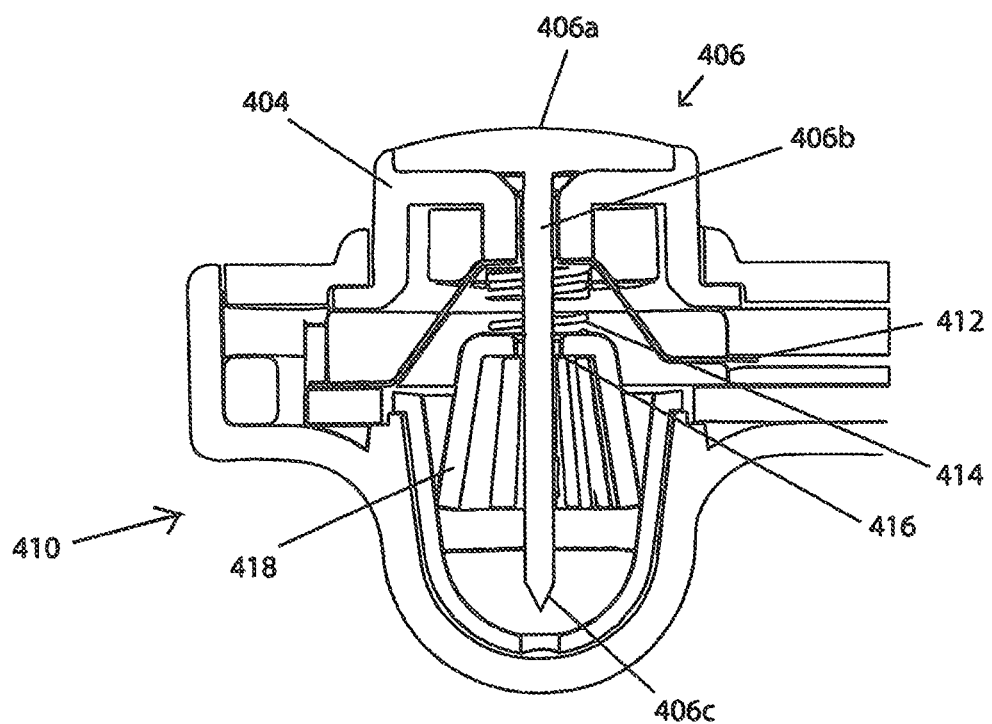
FIG. 29 is a sectional, close-up view of the locking mechanism of the security tag of the disclosed technology.

As shown in FIG. 29, the closing of the tag 400 can be accomplished by inserting the pin body 406b into pin receiver 404 which is aligned with opening 414 of the clutch assembly 410. Once the pin 406 is then fully inserted fully into the retaining mechanism 418 of the clutch assembly 410, the pin can become locked in place.

Figure 28:
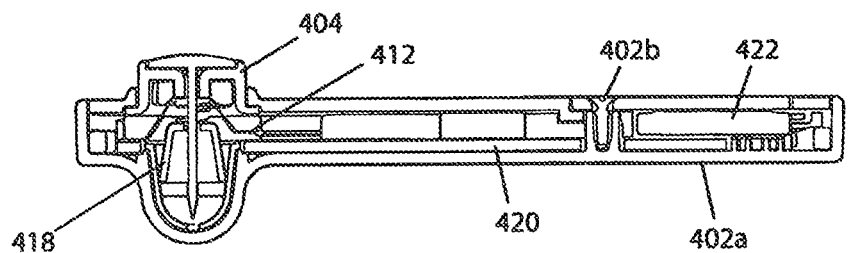
FIG. 28 is a side, sectional view of the security tag of the disclosed technology.
Figure 30:
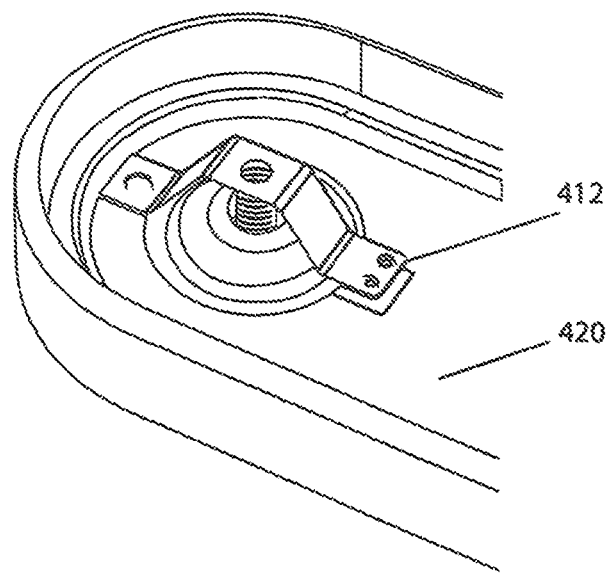
FIG. 30 is a close-up view of the locking mechanism of the security tag of the disclosed technology
Figure 31:
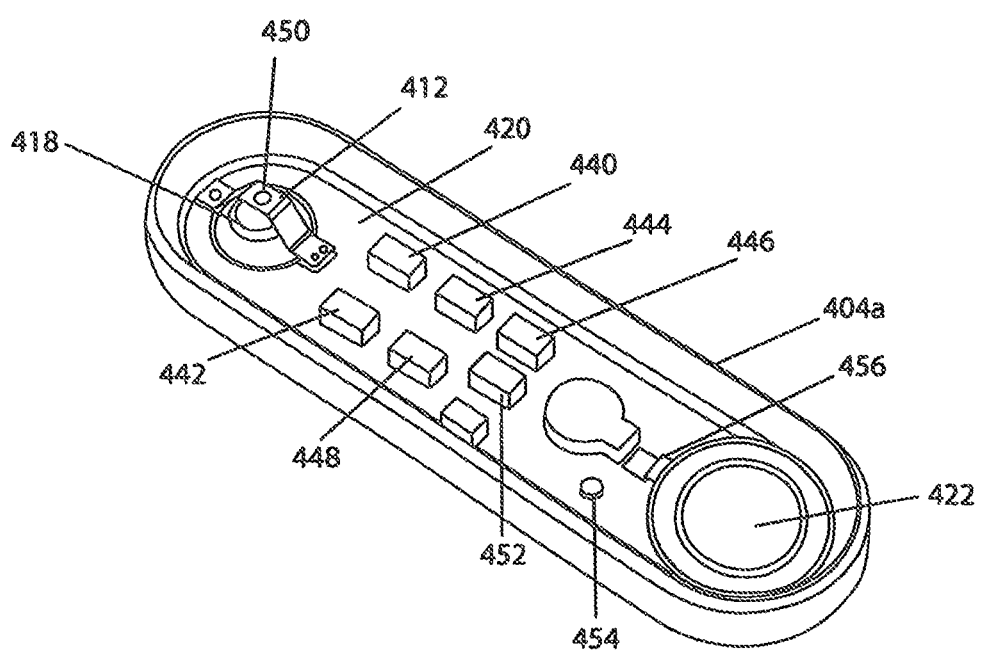
FIG. 31 is a top perspective view of security tag with a top removed of the disclosed technology.
Figure 32:
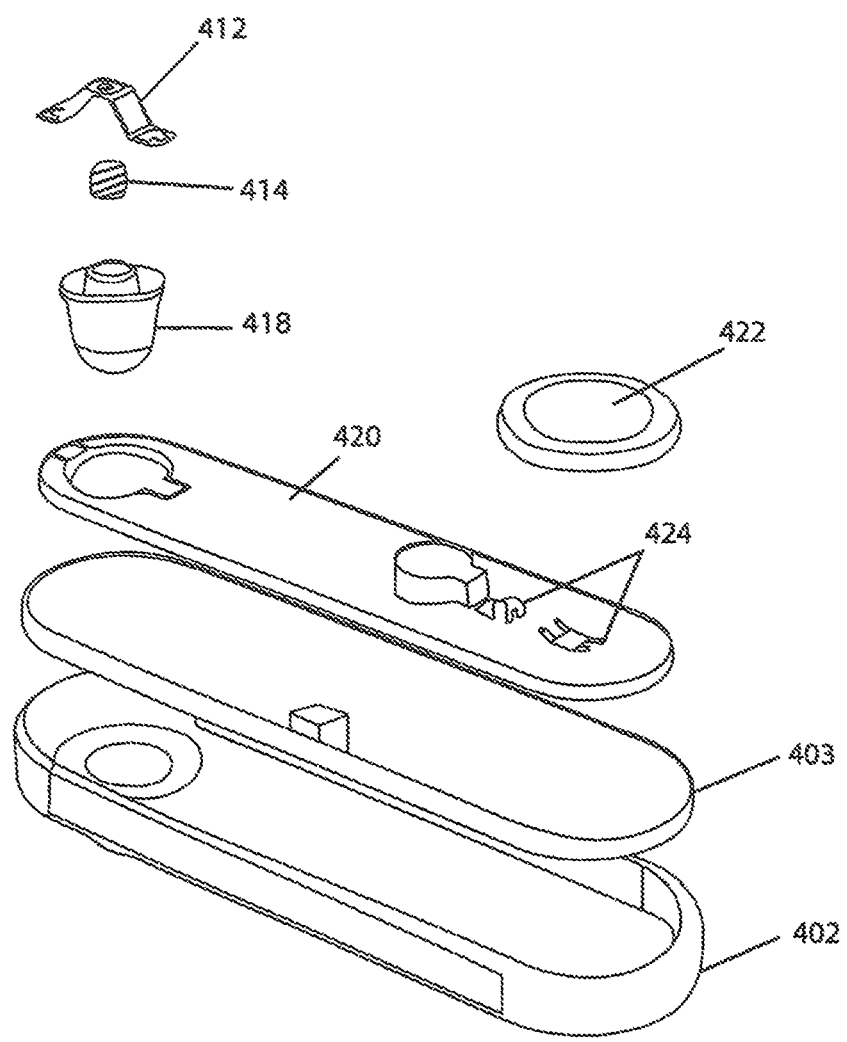
FIG. 32 is an exploded perspective view of a security tag of the disclosed technology.
Figure 33A:
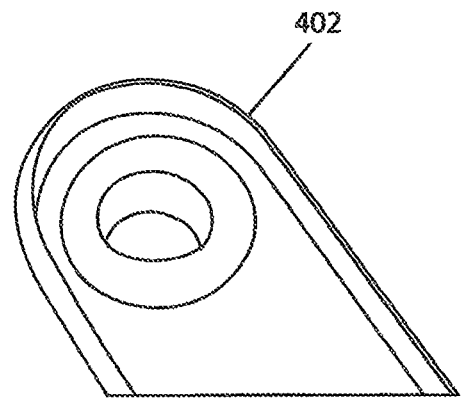
FIGS. 33a-f are a close-up views of the locking mechanism of the security tag of the disclosed technology.
Figure 33B:
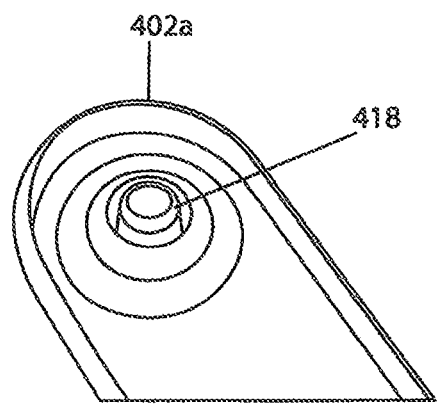
Figure 33C:
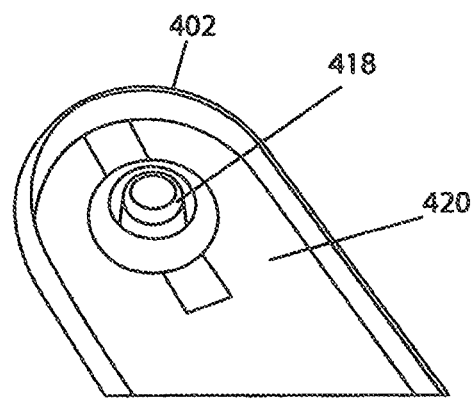
Figure 33D:
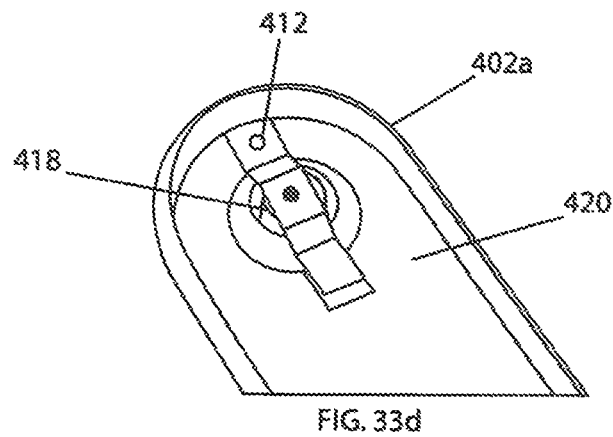
Figure 33E:
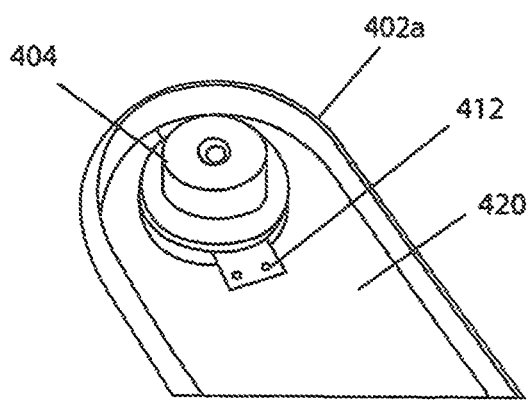
Figure 33F:
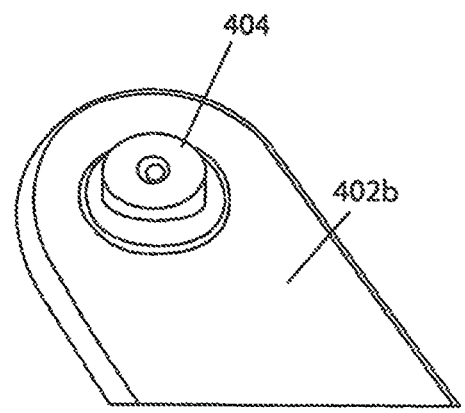

FIG. 28 shows a cross-sectional view of tag 400 with a pin 406 inserted. As shown in FIG. 29, the clutch mechanism 410 can include pin receiver 404, an electrical conductor 412, a spring 414, an opening 416 and a retaining mechanism 418. The electrical conductor 412 can be removably coupled to a component board 420, as shown in FIGS. 30-31. Once the pin is secured in a locked position, the electrical conductor 412 is brought into electrical contact with the component board 420 and the tag 400 is put into an active locked state, described below.

As shown in FIG. 31, the component board 420 can include an RFID chip 440 with transmitter/receiver, a 433 MHz uhf transmitter/receiver 442, a programmable chip 444, an on-board memory 446, a counter 448, a tamper assembly 450, a display 452, an auditory alarm 454 and battery connectors 456.

In use, the insertion or removal of the pin or cord into the insertion opening 416 connects or breaks the electrical continuity of the circuit. Every time the event sequence number changes, caused by a locking or unlocking event or a cut cable, the counter 448 can transmit the updated sequence number to the 433 mhz uhf transmitter/receiver 442.

If the pin is removed, or the cable is cut, the circuit is broken and the breaking of the circuit triggers a sequence event to the counting/cut chip 448. The counter 448 can also determine the current state of the tag, e.g., opened or closed, if interrogated to do so.

In some implementations, the RFID tag can include a tamper assembly 450 communicatively coupled to a pressure sensor 433 that surrounds the locking opening. If there is an undue amount of force applied to the clutch mechanism 410, e.g., a force greater than one pound, the pressure sensor 433 triggers an open condition within the counter 448. The counter 448 can then transmit the open condition to the master computer and the master computer can determine if the open condition is out of sequence or in-sequence. If out of sequence, the master computer can trigger an alert signal, e.g., an alert can be sent to store personnel that a theft of merchandise may be occurring.

The tag can also include a display 452 for displaying information about the article it is attached, e.g., price, SKU, number of items in inventory, available sizes in inventory, etc. The display can be an LCD or an electronic paper display (EPD).

In some implementations, the RFID tag can include an auditory alarm 454 and if the tag is breached a buzzer can be activated to alert of the breach. The auditory alarm 454 can also be used to signal to a user that the tag is in a locked position when going from an unlocked position to ensure proper contact was made.

Figure 34:
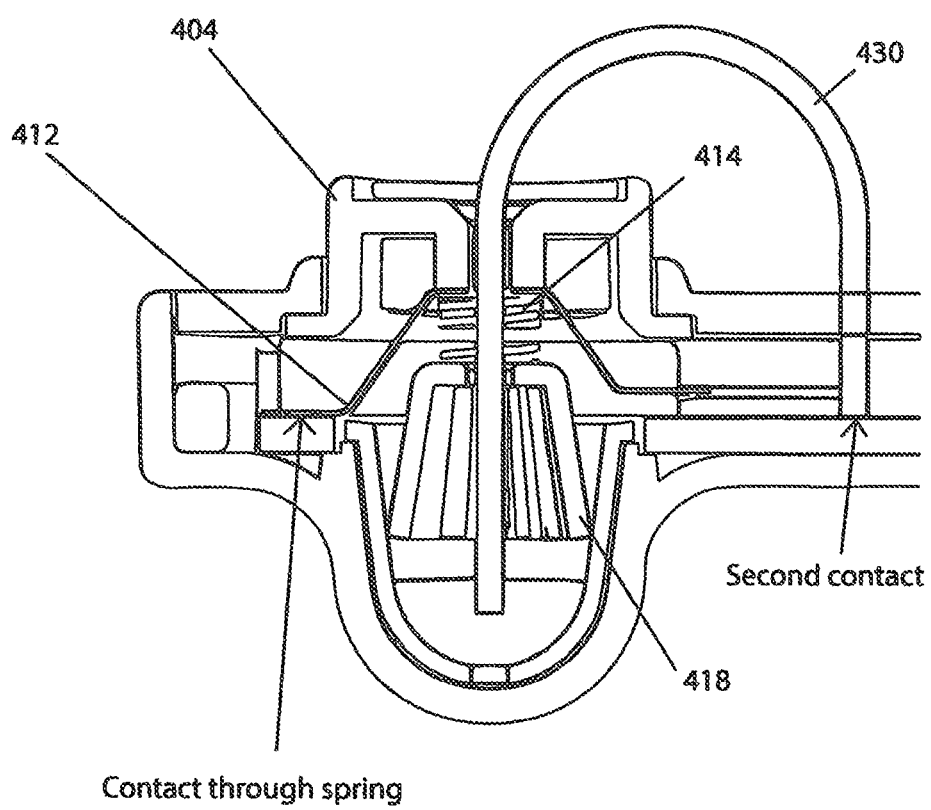
FIG. 34 is a sectional, close-up view of the locking mechanism of the security tag of the disclosed technology.

In another implementation, shown in FIG. 34, a cable 430 can be used in place of a pin. The cable 430 can have an electrical connection so that if the cable is cut an alarm can be triggered. For example, detecting if someone attached an extension to the cable and then cutting it in the middle.

In another implementation, the system can include an enhanced RFID shoplifting system. In the enhanced shoplifting system, the system can have a list of items marked with an RFID tag in which a set of items are keep at the front of the store.

This allows the system to identify items that are close to exits and may potentially trigger false alarms due to their locations. These listed items can be grouped so that the overall alarm is not triggered by from the alarm and can trigger the alarm only if the item is removed from its location. Can also group items together by characteristics such as high price and/or likelihood to be stolen. In another implementation, an RF antenna can be placed in the front of the store triggering an alarm based on price tag coming close to the front for any other predetermined condition.

While presently preferred embodiments have been described for purposes of the disclosure, numerous changes in the arrangement can be made by those skilled in the art. Such changes are encompassed within the spirit of the invention as defined by the appended claims.

The foregoing Detailed Description is to be understood as being in every respect illustrative and exemplary, but not restrictive, and the scope of the disclosed technology disclosed herein is not to be determined from the Detailed Description, but rather from the claims as interpreted according to the full breadth permitted by the patent laws. It is to be understood that the embodiments shown and described herein are only illustrative of the principles of the disclosed technology and that various modifications may be implemented by those skilled in the art without departing from the scope and spirit of the disclosed technology. Those skilled in the art could implement various other feature combinations without departing from the scope and spirit of the disclosed technology. Although the embodiments of the present disclosure have been described with specific examples, it is to be understood that the disclosure is not limited to those specific examples and that various other changes, combinations and modifications will be apparent to one of ordinary skill in the art without departing from the scope and spirit of the disclosed technology which is to be determined with reference to the following claims.

The invention claimed is:

1. A security tag comprising:
   an RFID chip having a passive transmitter/receiver operable at a first frequency;
   an active transmitter/receiver operable at a second frequency that is different from the first frequency;
   a solar panel, the solar panel providing energy to the active transmitter/receiver; and
   a tamper assembly, the tamper assembly including a clutch mechanism capable of affixing the security tag to a merchandise item and a locking device for inserting into the clutch mechanism, an insertion of the locking device into the clutch mechanism causes the active transmitter/receiver to transmit a closed signal indicating a closed status for the security tag, and a displacement of the locking device causes the active transmitter/receiver to transmit an open signal indicating an open status for the security tag.

2. The security tag of claim 1 wherein the second frequency is a 433 MHz uhf.

3. The security tag of claim 1 further comprising:
   an on-board memory.

4. The security tag of claim 3 wherein the active transmitter/receiver receives price changes from a master computer and stores the price changes on the on-board memory.

5. The security tag of claim 3 wherein the active transmitter/receiver receives SKU changes from a master computer and stores the SKU changes on the on-board memory.

6. The security tag of claim 3 wherein the active transmitter/receiver receives product description changes from a master computer and stores the product description changes on the on-board memory.

7. The security tag of claim 3 further comprising:
   a display, the display showing at least one attribute of merchandise data.

8. The security tag of claim 7 wherein the display is an electronic paper display.

9. The security tag of claim 7 wherein the at least one attribute of the merchandise data is a price, a SKU number or a product description.

10. The security tag of claim 1 wherein the displacement of the locking device is one of:
    cutting of the locking device, removing of the locking device from the clutch mechanism, cutting a body of the security tag at any location and applying pressure to the locking device.

11. The security tag of claim 1, wherein the second frequency is a 433 MHz uhf.

12. The security tag of claim 1, further comprising:
    an on-board memory.

13. The security tag of claim 12, wherein the active transceiver is configured to receive price changes from a master computer and stores the price changes on the on-board memory.

14. The security tag of claim 12, wherein the active transceiver is configured to receive SKU changes from a master computer and stores the SKU changes on the on-board memory.

15. The security tag of claim 12, wherein the active transceiver is configured to receive product description changes from a master computer and stores the product description changes on the on-board memory.

16. The security tag of claim 12, further comprising:
a display, the display showing at least one attribute of merchandise data.

17. The security tag of claim 16, wherein the at least one attribute of the merchandise data is a price, a SKU number or a product description.

18. A security tag comprising:
an RFID chip having a passive transceiver operable at a first frequency;
an active transceiver operable at a second frequency that is different from the first frequency;
a power source configured to provide energy to the active transceiver; and
a tamper assembly, the tamper assembly including a clutch mechanism configured to couple the security tag to a merchandise item and a locking device configured to be inserted into the clutch mechanism, wherein insertion of the locking device into the clutch mechanism causes the active transceiver to transmit a closed signal indicating a closed status for the security tag, and a displacement of the locking device causes the active transceiver to transmit an open signal indicating an open status for the security tag.

* * * * *